United States Patent
Shohara et al.

(10) Patent No.: US 12,485,472 B2
(45) Date of Patent: Dec. 2, 2025

(54) PRESSED ARTICLE, PRESSING DEVICE, AND PRESSING METHOD

(71) Applicants: DENSO CORPORATION, Kariya (JP); DENSO PRESSTECH INC., Toyokawa (JP)

(72) Inventors: Hiroshi Shohara, Kariya (JP); Kosuke Niimi, Toyokawa (JP); Masayuki Hamada, Toyokawa (JP)

(73) Assignees: DENSO CORPORATION, Kariya (JP); DENSO PRESSTECH INC., Toyokawa (JP)

( * ) Notice: Subject to any disclaimer, the term of this patent is extended or adjusted under 35 U.S.C. 154(b) by 175 days.

(21) Appl. No.: 18/321,577

(22) Filed: May 22, 2023

(65) Prior Publication Data

US 2023/0294161 A1 Sep. 21, 2023

Related U.S. Application Data

(63) Continuation of application No. PCT/JP2021/039093, filed on Oct. 22, 2021.

(30) Foreign Application Priority Data

Nov. 27, 2020 (JP) .................. 2020-197452

(51) Int. Cl.
*B32B 3/00* (2006.01)
*B21J 5/02* (2006.01)
*B21J 5/06* (2006.01)
*B21J 13/02* (2006.01)
*B32B 3/26* (2006.01)
*B32B 3/30* (2006.01)

(52) U.S. Cl.
CPC ............... *B21J 5/02* (2013.01); *B21J 5/068* (2020.08); *B21J 13/02* (2013.01)

(58) Field of Classification Search
CPC ............... B32B 3/00; B32B 3/26; B32B 3/30
USPC ........................................... 428/598
See application file for complete search history.

(56) References Cited

U.S. PATENT DOCUMENTS

2004/0232798 A1  11/2004  Kobayashi et al.

FOREIGN PATENT DOCUMENTS

| JP | S5635964 B2 | 8/1981 |
| JP | 2004350374 A | 12/2004 |

OTHER PUBLICATIONS

Handbook of technology of plasticity, Corona Publishing Co., Ltd., (2006).

*Primary Examiner* — Katherine A Christy
(74) *Attorney, Agent, or Firm* — Harness, Dickey & Pierce, P.L.C.

(57) ABSTRACT

A pressed article includes a main body, a recess portion, a pin, and a groove portion. The main body has a plate shape. The recess portion is provided in a first surface of the main body facing one side in a plate thickness direction of the main body. The pin is provided at a position corresponding to the recess portion on a side of a second surface opposite to the first surface of the main body, is formed to have an outer shape smaller than that of the recess portion when viewed in the plate thickness direction of the main body, and protrudes in the plate thickness direction of the main body. The groove portion is recessed from the second surface of the main body toward the first surface and is provided to surround at least a part of the periphery of the pin.

10 Claims, 25 Drawing Sheets

PRESSED ARTICLE, PRESSING DEVICE, AND PRESSING METHOD

CROSS REFERENCE TO RELATED APPLICATION

The present application is a continuation application of International Patent Application No. PCT/JP2021/039093 filed on Oct. 22, 2021, which designated the U.S. and claims the benefit of priority from Japanese Patent Application No. 2020-197452 filed on Nov. 27, 2020. The entire disclosures of all of the above applications are incorporated herein by reference.

TECHNICAL FIELD

The present disclosure relates to a pressed article, a pressing device for manufacturing the same, and a pressing method.

BACKGROUND

Conventionally, press working has been used to form a pressed article.

SUMMARY

According to an aspect of the present disclosure, a pressed article includes a main body, a recess portion, a pin, and a groove portion.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
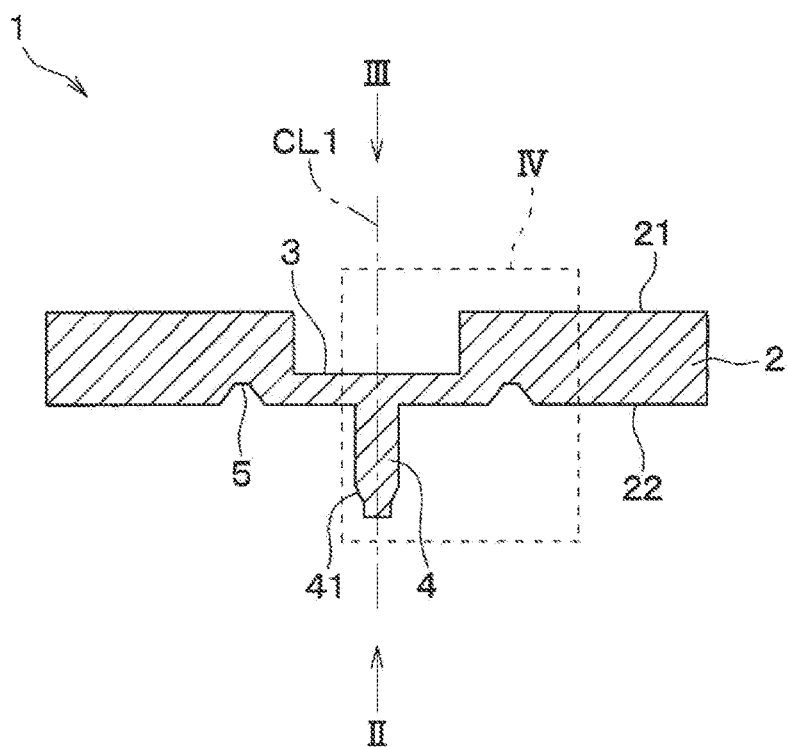
FIG. 1 is a cross-sectional view of a pressed article according to a first embodiment.

Hereinafter, examples of the present disclosure will be described.

According to an example of the present disclosure, a pin is formed on a plate-shaped member by press working. The pin of the member is inserted into a hole provided in another member, and the two members are coupled by rivet caulking, rolling caulking, or the like.

According to an example of the present disclosure, an intermediate terminal of a commutator and a connection terminal are coupled to each other by caulking. Specifically, a pin (a protrusion portion) formed in the intermediate terminal is inserted into a hole (a fitting hole) provided in the connection terminal, then a load is applied to a tip of the pin to deform the tip of the pin, and thus the intermediate terminal and the connection terminal are coupled to each other by caulking. After being coupled to each other by caulking, the intermediate terminal and the connection terminal are resin molded together with a segment of the commutator.

When two members are connected by caulking, it is possible to increase strength of caulking connection between the two members by increasing a height of the pin. Therefore, when a pin used for caulking is to be formed by press working, it is required to increase a height of the pin.

Generally, when a pin is extrusion-formed by press working, a die having a hole for forming the pin and a punch are prepared, and a workpiece is placed between the die and the punch. Then, by moving the punch toward the hole of the die, a part of a material of the workpiece is extruded into the hole of the die to form the pin on the workpiece.

At this time, as a method for increasing the height of the pin to be formed by press working, there is a method for setting an inside shape of the hole provided in the die such that an inner diameter on a deep portion side is larger than an inner diameter on an inlet side. Accordingly, a frictional resistance between the material of the workpiece extruded inside the hole of the die and an inner wall of the hole of the die during press working is reduced, and the pin can be formed to be high.

However, in this method, when a material flow of the workpiece which is extruded inside the hole of the die is non-uniform during press working, the pin may be bent in a deep portion of the hole, and straightness of the pin cannot be maintained.

On the other hand, when an inner diameter of the hole provided in the die is set to be constant from the inlet side to the deep portion in order to maintain the straightness of the pin, the frictional resistance between the material of the workpiece extruded inside the hole of the die and the inner wall of the hole of the die is increased during press working, and it is difficult to form the pin to be high.

An example of the present disclosure relates to a pressed article. The pressed article comprises a main body, a recess portion, a pin, and a groove portion. The main body is plate shaped. The recess portion is provided in a first surface of the main body facing one side in a plate thickness direction of the main body. The pin is provided at a position corresponding to the recess portion on a side of a second surface opposite to the first surface of the main body, having an outer shape smaller than an outer shape of the recess portion when viewed in the plate thickness direction of the main body, and protruding in the plate thickness direction of the main body. The groove portion is recessed from the second surface of the main body toward the first surface and surrounding at least a part of a periphery of the pin.

Accordingly, when the pressed article having this shape is manufactured, a first mold located on a side of the first surface facing the main body and a second mold located on a side of the second surface facing the main body are prepared. The first mold includes a punch configured to form the recess portion in the first surface of the main body, and a stripper configured to press the first surface outside the punch, and the second mold includes a hole portion configured to form the pin on the second surface of the main body, and a protrusion configured to form the groove portion. During press working, by placing the main body that is a workpiece between the first mold and the second mold and driving the punch into the first surface of the main body, the recess portion is formed in the first surface, and a material of the main body is extruded from the hole portion of the second mold to form the pin on the second surface. At this time, since a flow of the material of the main body in a surface direction of the second surface due to a pressing force of the punch is blocked by the protrusion of the second mold, a propulsive force for extruding the material of the main body into the hole portion of the second mold is increased. Therefore, when the pressed article having this shape is manufactured by press working, the straightness of the pin can be ensured, and the pin can be formed to be high.

In the present specification, the press working includes cold forging.

Another example of the present disclosure relates a pressing device for manufacturing a pressed article. The pressing device comprises a first mold and a second mold. The first mold is located on a side of a first surface of a plate-shaped main body of the pressed article. The first surface faces one side in a plate thickness direction of the plate-shaped main body. The second mold is located on a side of a second surface of the main body opposite to the first surface. The first mold includes a punch configured to form a recess portion in the first surface of the main body, and a stripper configured to, on an outside of the punch, press the first surface. The second mold includes a base portion having a surface to be brought into contact with the second surface of the main body, a hole portion provided at a position corresponding to the punch, having an outer shape smaller than an outer shape of the punch when viewed in the plate thickness direction of the main body, and configured to form a pin protruding from the second surface, and a protrusion protruding from the base portion toward the first mold, surrounding at least a part of a periphery of the hole portion, and configured to form a groove portion in the second surface.

Accordingly, when the pressed article is manufactured by a pressing device, by placing the main body that is the workpiece between the first mold and the second mold, and driving the punch into the first surface of the main body, the recess portion is formed in the first surface and the material of the main body is extruded from the hole portion of the second mold to form the pin on the second surface. At this time, by providing the protrusion for forming the groove portion of the pressed article in the second mold, the flow of the material of the main body in the surface direction of the second surface due to the pressing force of the punch is blocked by the protrusion of the second mold, and the propulsive force for extruding the material of the main body into the hole portion of the second mold is increased. Therefore, the pressing device can ensure the straightness of the pin to be formed in the pressed article and can form the pin to be high.

Still another example of the present disclosure relates to a pressing method for manufacturing a pressed article. The pressing method comprises the following processes. First, preparing a pressing device is implemented. The pressing device includes a first mold and a second mold. The first mold includes a punch configured to form a recess portion in a first surface of a main body of the pressed article facing one side in a plate thickness direction of the main body, and a stripper configured to, on an outside of the punch, press the first surface. The second mold includes a base portion having a surface to be brought into contact with a second surface of the main body opposite to the first surface, a hole portion provided at a position corresponding to the punch, having an outer shape smaller than an outer shape of the punch when viewed in the plate thickness direction of the main body, and configured to form a pin protruding from the second surface, and a protrusion protruding from the base portion toward the first mold, surrounding at least a part of a periphery of the hole portion, and configured to form a groove portion in the second surface. Subsequently, placing, as a workpiece, the main body of the pressed article between the first mold and the second mold is implemented. Subsequently, moving the stripper toward the second mold to form at least a part of the groove portion in the second surface by the protrusion is implemented. Subsequently, further moving the stripper toward the second mold to form the groove portion in the second surface by the protrusion, and moving the punch toward the second mold to form the recess portion in the first surface and to from the pin by the hole portion is implemented. Subsequently, moving the first mold away from the second mold, and removing the pressed article from between the first mold and the second mold is implemented.

According to the pressing method, after the stripper is moved toward the second mold and at least a part of the groove portion is formed in the second surface by the protrusion, the punch is moved toward the second mold, the recess portion is formed in the first surface, and the pin is formed by the hole portion. Therefore, when the punch is moved toward the second mold, since the flow of the material of the main body in the surface direction of the second surface due to the pressing force of the punch is blocked by the protrusion for forming the groove portion in the previous step, the propulsive force for extruding the material of the main body into the hole portion of the second mold is increased. Therefore, according to the pressing method, the straightness of the pin formed in the pressed article can be ensured, and the pin can be formed to be high.

Embodiments of the present disclosure will be described below with reference to the drawings. In the following embodiments, the same or equivalent parts are denoted by the same reference numerals, and descriptions thereof will be omitted.

First Embodiment

A pressed article, a pressing device, and a pressing method according to a first embodiment will be described with reference to the drawings. Shapes of the pressed article and the pressing device described in the first embodiment are merely examples, and the present disclosure is not limited thereto. The same applies to a second embodiment and a third embodiment described later.

<Configuration of Pressed Article>

First, a configuration of a pressed article 1 according to the first embodiment will be described. The pressed article 1 is manufactured by extrusion using the pressing device. The pressed article 1 can also be referred to as a plastic-worked article or a cold-forged article.

Figure 2:
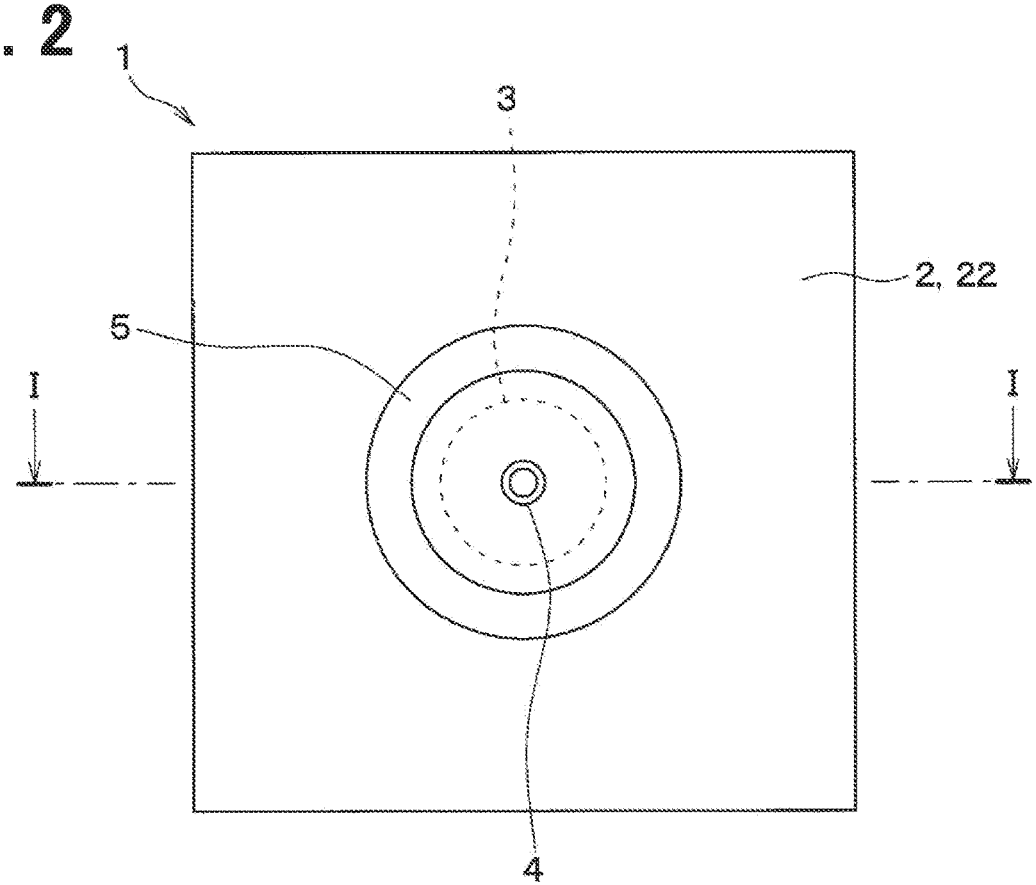
FIG. 2 is a view taken in a direction of an arrow II in FIG. 1.
Figure 3:
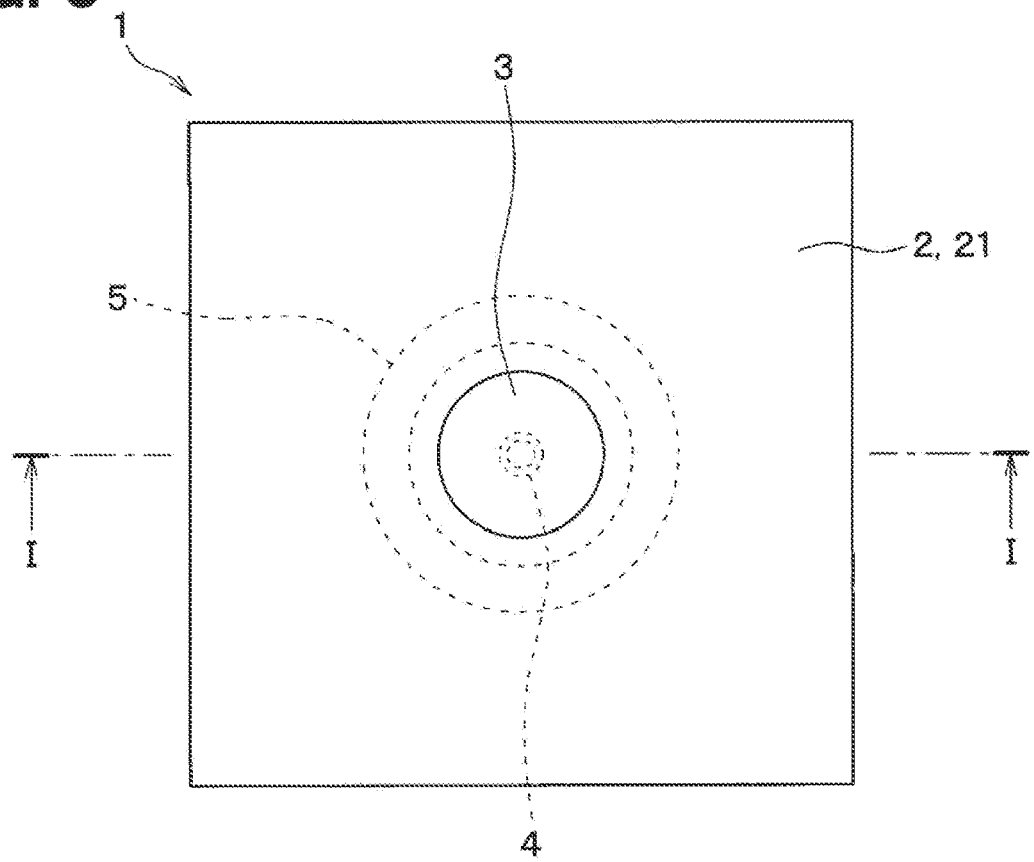
FIG. 3 is a view taken in a direction of an arrow III in FIG. 1.

As illustrated in FIGS. 1 to 3, the pressed article 1 according to the first embodiment includes a main body 2, a recess portion 3, a pin 4, and a groove portion 5, and is integrally formed of metal.

The main body 2 is a plate-shaped member. A surface of the main body 2 facing one side in a plate thickness direction of the main body 2 is referred to as a first surface 21, and a surface of the main body 2 facing the other side in the plate thickness direction is referred to as a second surface 22. That is, an opposite side of the first surface 21 of the main body 2 is the second surface 22. The recess portion 3 is provided in the first surface 21 of the main body 2, and the pin 4 and the groove portion 5 are provided in the second surface 22 of the main body 2.

The recess portion 3 is a portion recessed from the first surface 21 of the main body 2 toward the second surface 22. The recess portion 3 is formed to be recessed, for example, in a columnar shape. A shape and a size of the recess portion 3 are larger than a shape and a size of the pin 4 in a state of being viewed in a plate thickness direction of the main body 2 (hereinafter referred to as "viewed in the plate thickness direction of the main body 2").

The pin 4 protrudes from the second surface 22 of the main body 2 in the plate thickness direction of the main body 2. The pin 4 is provided at a position corresponding to the recess portion 3. Specifically, an axis center CL1 of the pin 4 and a center of the recess portion 3 may be located at substantially the same position or slightly shifted from each other. The pin 4 is formed in a columnar shape, for example, and has a shape in which an outer periphery 41 of a tip portion thereof is chamfered. When viewed in the plate thickness direction of the main body 2, an outer shape of the pin 4 is formed to be smaller than an outer shape of the recess portion 3. The axis center CL1 of the pin 4 is formed perpendicular to the second surface 22.

The groove portion 5 is a groove that is recessed from the second surface 22 of the main body 2 toward the first surface 21 and is provided to surround at least a part of a periphery of the pin 4. In the first embodiment, the groove portion 5 surrounds the entire periphery of the pin 4. A position where the groove portion 5 is provided is set in an area outside an inscribed circle of a shape of the recess portion 3 and on an inner side of a position obtained by adding a distance of 1.5 times a plate thickness T of the main body 2 to a radius of a circumscribed circle of the shape of the recess portion 3, when viewed in the plate thickness direction of the main body 2. A reason for this will be described later. In the first embodiment, since the recess portion 3 is formed in a columnar shape, the inscribed circle and the circumscribed circle of the recess portion 3 are the same.

Figure 4:
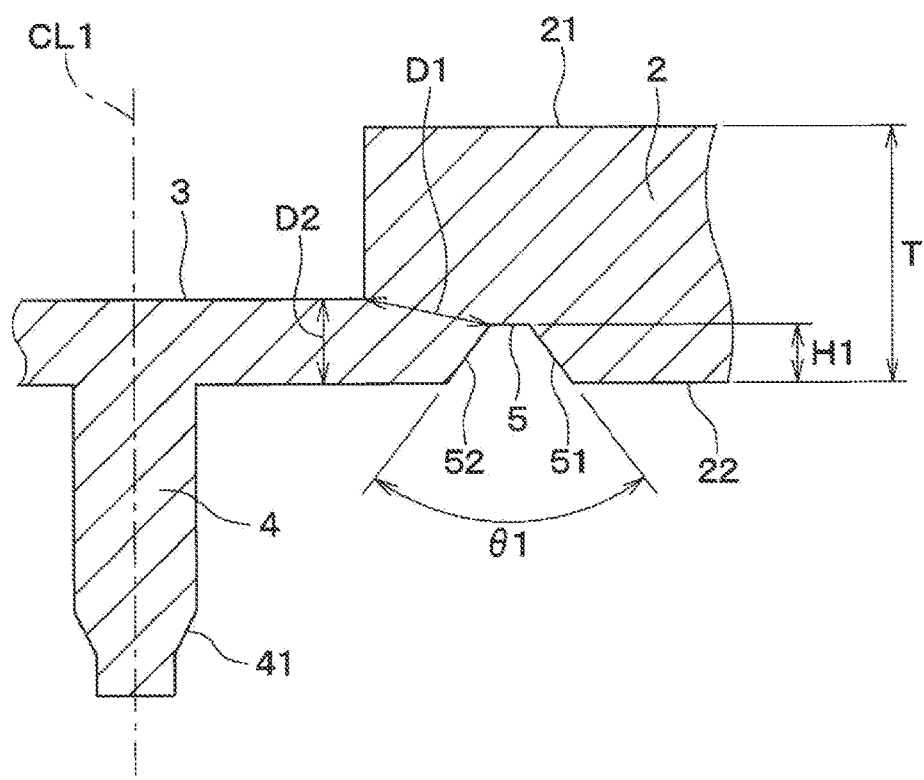
FIG. 4 is an enlarged view of a portion IV in FIG. 1.

As illustrated in FIGS. 1 and 4, the groove portion 5 has such tapered inner wall surfaces 51 and 52 that a width of the groove portion 5 gradually decreases from the second surface 22 toward the first surface 21 in a cross-sectional view parallel to the plate thickness direction of the main body 2. A taper angle 81 is in a range of 40° to 80°, more preferably a range of 55° to 65°. A depth H1 of the groove portion 5 is in a range of 2% to 20%, more preferably a range of 8% to 15% of the plate thickness T of the main body 2.

A distance D1 between the recess portion 3 and the groove portion 5 is larger than a distance D2 between the recess portion 3 and the second surface 22 in the cross-sectional view parallel to the plate thickness direction of the main body 2. Accordingly, since a thickness of the main body 2 is prevented from being minimized between the recess portion 3 and the groove portion 5, the strength of the pressed article 1 can be ensured.

<Configuration of Pressing Device>

Next, the pressing device for manufacturing the pressed article 1 according to the first embodiment will be described with reference to FIG. 9.

Figure 9:
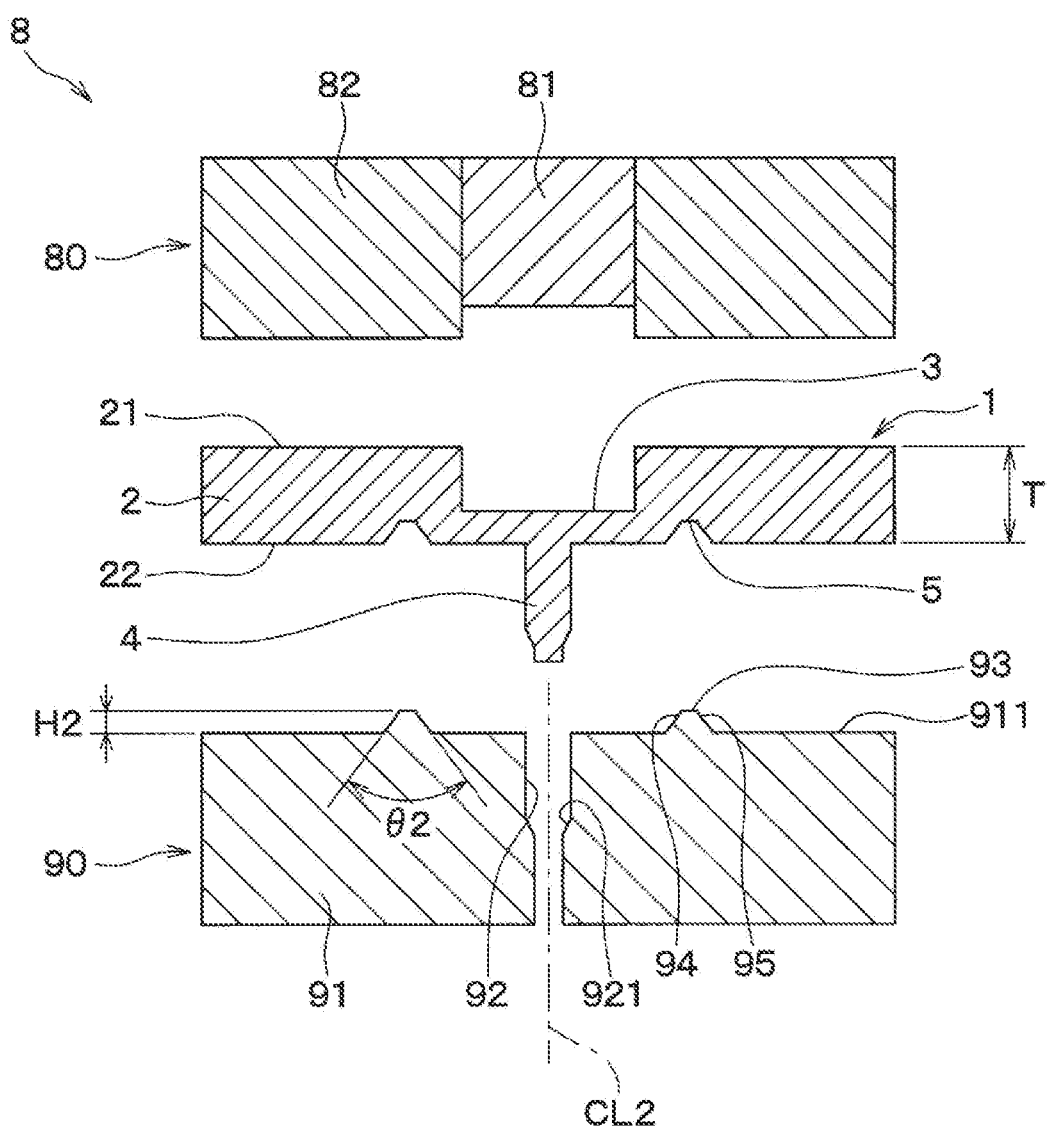
FIG. 9 is a diagram illustrating a manufacturing process of the pressed article according to the first embodiment.

As illustrated in FIG. 9, a pressing device 8 includes a first mold 80 located on a side of the first surface 21 facing the main body 2 of the pressed article 1, and a second mold 90 located on a side of the second surface 22 facing the main body 2.

The first mold 80 includes a punch 81 and a stripper 82.

The punch 81 is a movable mold that forms the recess portion 3 in the first surface 21 of the main body 2. In the first embodiment, the punch 81 has a columnar shape. When viewed in the plate thickness direction of the main body 2 (that is, in a state of being viewed in a moving direction of the first mold 80), a shape and a size of the punch 81 are formed to be larger than a shape and a size of a hole portion 92 of the second mold 90. The stripper 82 is a movable mold that is provided outside the punch 81 to surround the punch 81 and presses the first surface 21 of the main body 2. The punch 81 and the stripper 82 can be individually moved by a drive device (not illustrated).

The second mold 90 includes a base portion 91, the hole portion 92, and a protrusion 93. The second mold 90 is called a die.

The base portion 91 is a portion having a surface 911 to be brought into contact with the second surface 22 of the pressed article 1. The surface 911 is a surface of the base portion 91 facing the first mold 80, and has a planar shape.

The hole portion 92 is a through hole for forming the pin 4 of the pressed article 1, and is provided at a position corresponding to the punch 81. The hole portion 92 is formed in, for example, a cylindrical shape, and a tapered portion 921 for forming a chamfered shape at a tip of the pin 4 is provided in the middle of a cylindrical inner wall of the hole portion 92. The tapered portion 921 has a large diameter on a side of the punch 81, and the diameter gradually decreases toward a deep portion. The hole portion 92 has a constant inner diameter from an inlet side (that is, the side of the punch 81) to a large diameter side of the tapered portion 921. When viewed in the plate thickness direction of the main body 2, an outer shape of the hole portion 92 is formed to be smaller than an outer shape of the punch 81. An axis center CL2 of the hole portion 92 is formed perpendicular to the surface 911 of the base portion 91 facing the first mold 80. The axis center CL2 of the hole portion 92 is formed parallel to the moving direction of the first mold 80 (that is, the plate thickness direction of the main body 2).

The protrusion 93 is a portion that forms the groove portion 5 of the pressed article 1, protrudes from the base portion 91 toward the first mold 80, and surrounds at least a part of a periphery of the hole portion 92. In the first embodiment, the protrusion 93 surrounds the entire periphery of the hole portion 92. A position where the protrusion 93 is provided is set in an area outside an inscribed circle of a shape of the punch 81 and on an inner side of a position obtained by adding a distance of 1.5 times the plate thickness T of the main body 2 to a radius of a circumscribed circle of the shape of the punch 81, when viewed in the plate thickness direction of the main body 2. A reason for this will be described later. In the first embodiment, since the punch 81 is formed in a columnar shape, the inscribed circle and the circumscribed circle of the punch 81 are the same.

Figure 8:
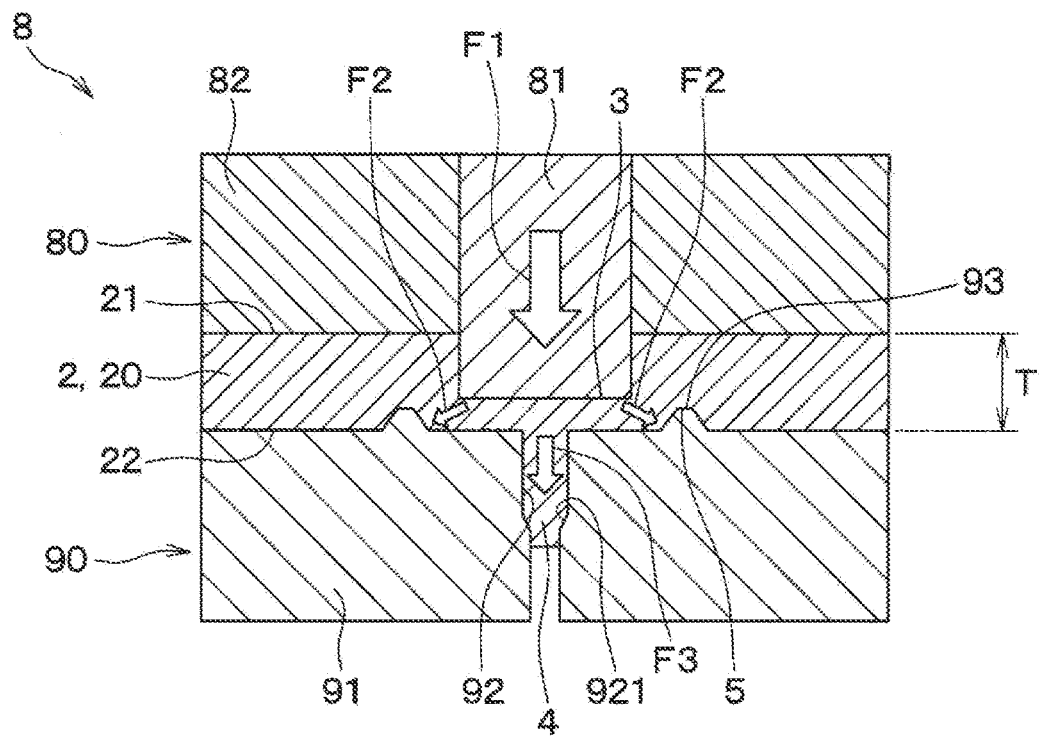
FIG. 8 is a diagram illustrating a manufacturing process of the pressed article according to the first embodiment.

The protrusion 93 has such tapered outer wall surfaces 94 and 95 that a width of the protrusion 93 gradually decreases from the base portion 91 toward the first mold 80 in a cross-sectional view parallel to the plate thickness direction of the main body 2. A taper angle 82 is in a range of 40° to 80°, more preferably a range of 55° to 65°. A height H2 of the protrusion 93 is in a range of 2% to 20%, more preferably a range of 8% to 15% of the plate thickness T of the main body 2. The plate thickness T of the main body 2 coincides with a distance between the stripper 82 and the second mold 90 in a state where the stripper 82 is closest to the second mold 90. As illustrated in FIGS. 8 and 10B, in a state where the punch 81 and the stripper 82 are closest to the second mold 90, a distance between the punch 81 and the protrusion 93 is larger than a distance between the punch 81 and the base portion 91.

<Pressing Method>

Next, a method for manufacturing the pressed article 1 using the pressing device 8 according to the first embodiment will be described with reference to a flowchart of FIG. 5 and diagrams of FIGS. 6 to 9.

Figure 5:
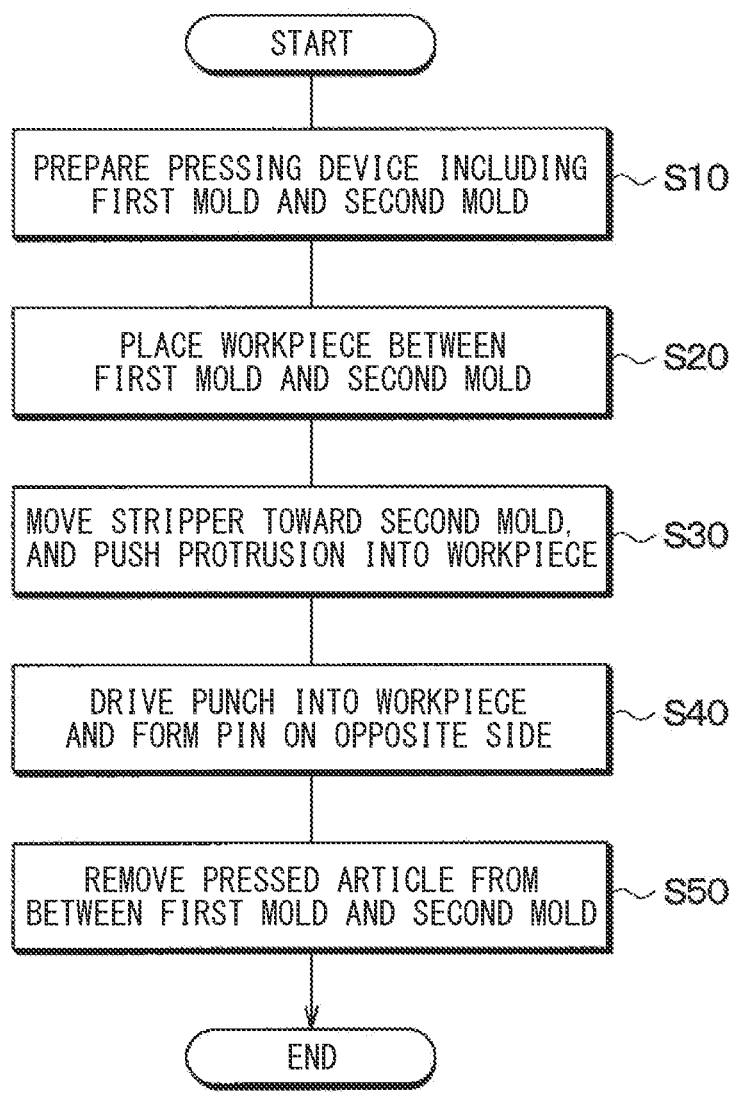
FIG. 5 is a flowchart illustrating a method for manufacturing the pressed article according to the first embodiment.

First, in step S10 of FIG. 5, the pressing device 8 including the first mold 80 and the second mold 90 described above is prepared.

Figure 6:
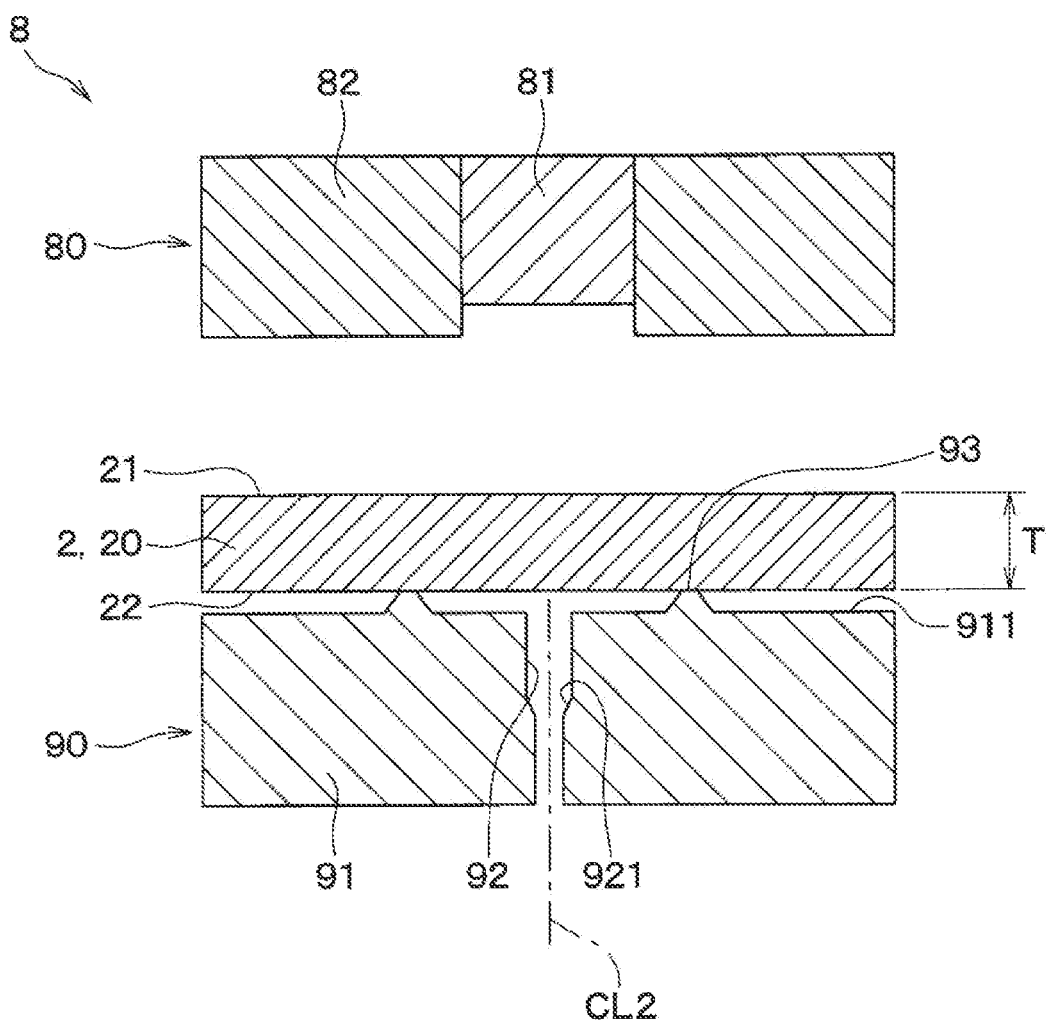
FIG. 6 is a diagram illustrating a manufacturing process of the pressed article according to the first embodiment.

Next, in step S20, a workpiece 20 is placed between the first mold 80 and the second mold 90. The above state is shown in FIG. 6. As shown in FIG. 6, the workpiece 20 placed between the first mold 80 and the second mold 90 corresponds to the main body 2 of the pressed article 1. A plate thickness of the workpiece 20 is the same as the plate thickness T of the main body 2 of the pressed article 1.

Figure 7:
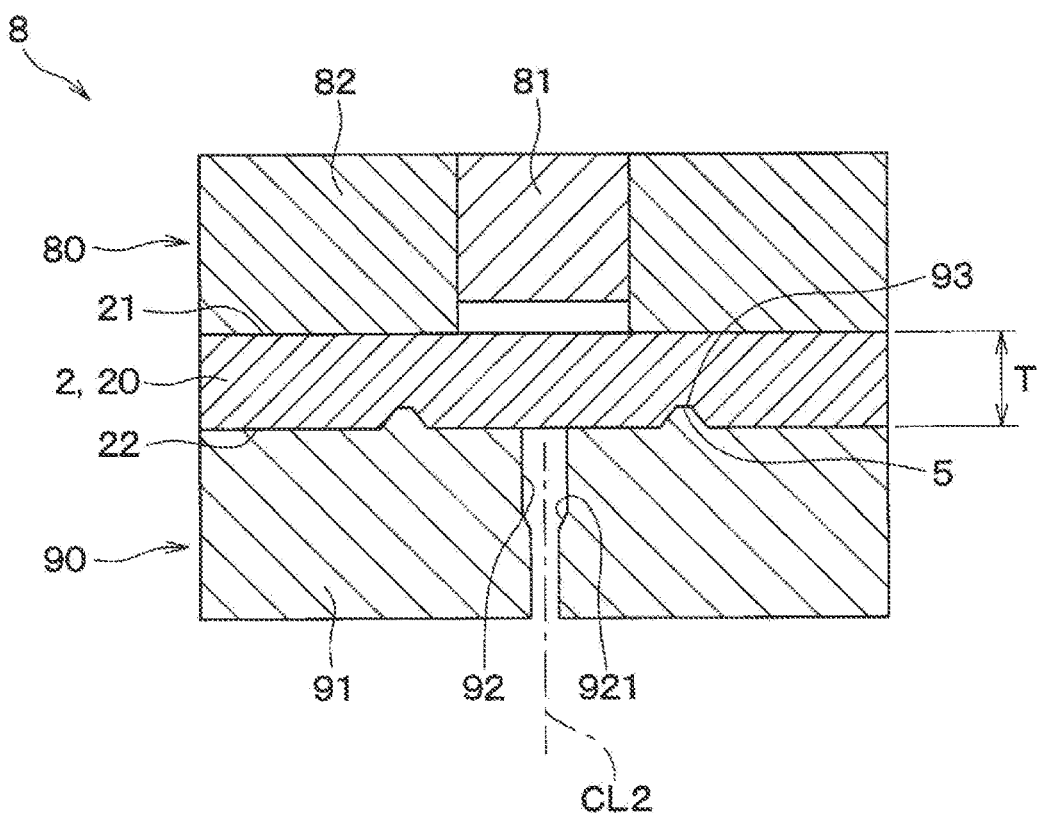
FIG. 7 is a diagram illustrating a manufacturing process of the pressed article according to the first embodiment.

Subsequently, in step S30 of FIG. 5, the stripper 82 of the first mold 80 is moved toward the second mold 90, and the protrusion 93 is pushed into the workpiece 20. The above state is illustrated in FIG. 7. As illustrated in FIG. 7, the workpiece 20 is pressed toward the second mold 90 by a pressing force of the stripper 82, and the protrusion 93 of the second mold 90 is pushed into the workpiece 20. Accordingly, the groove portion 5 is formed in the second surface 22 of the main body 2 of the pressed article 1. FIG. 7 illustrates a state in which the entire groove portion 5 is formed in the second surface 22 of the main body 2, but the state is merely an example, and at least a part of the groove portion 5 may be formed in the second surface 22 of the main body 2 in step S30.

Next, in step S40 of FIG. 5, the punch 81 is driven into the workpiece 20, and the pin 4 is formed on an opposite side. The above state is illustrated in FIG. 8. As indicated by an arrow F1 in FIG. 8, when the punch 81 is moved toward the second mold 90 and driven into the main body 2 which is the workpiece 20, and the recess portion 3 is formed in the first surface 21 of the pressed article 1, the material of the workpiece 20 flows and the pin 4 is formed on the second surface 22. At this time, as indicated by arrows F2, a flow of the material of the workpiece 20 in a surface direction of the second surface 22 due to a pressing force of the punch 81 is blocked by the protrusion 93 of the second mold 90. Therefore, as indicated by an arrow F3, a propulsive force for extruding the material of the workpiece 20 into the hole portion 92 of the second mold 90 is increased. Therefore, even when the frictional resistance between the material of the workpiece 20 extruded inside the hole portion 92 and the inner wall of the hole portion 92 is large, the pin 4 can be formed to be high. Since the hole portion 92 has a constant inner diameter from the inlet side (that is, the side of the punch 81) to the large diameter side of the tapered portion 921, the straightness of the pin 4 can be ensured. When a part of the groove portion 5 is formed in the second surface 22 of the main body 2 in step S30, in step S40, the punch 81 is driven, the stripper 82 is further moved toward the second mold 90, and the groove portion 5 is formed in the second surface 22 of the main body 2 by the protrusion 93.

Thereafter, in step S50 of FIG. 5, the stripper 82 and the punch 81 are moved in a direction away from the second mold 90, and the pressed article 1 is removed from between the first mold 80 and the second mold 90. The above state is illustrated in FIG. 9. Thereafter, a finishing process or the like is performed, and the pressed article 1 is completed.

The pin 4 of the pressed article 1 is used when the pressed article 1 and another component (not illustrated) are caulked and connected to each other. In a process for caulking and connecting the pressed article 1 and the other component, the pin 4 of the pressed article 1 is inserted into a hole provided in the other component, and then a load is applied to the tip of the pin 4 to deform the tip of the pin 4. Accordingly, the pressed article 1 and the other component are caulked and connected to each other. At this time, since the pin 4 of the pressed article 1 is formed to be high, the strength of caulking connection is high.

First Comparative Example

Here, in order to compare with the first embodiment described above, a pressed article 101, a pressing device 801, and a pressing method according to a first comparative example will be described.

Figure 25:
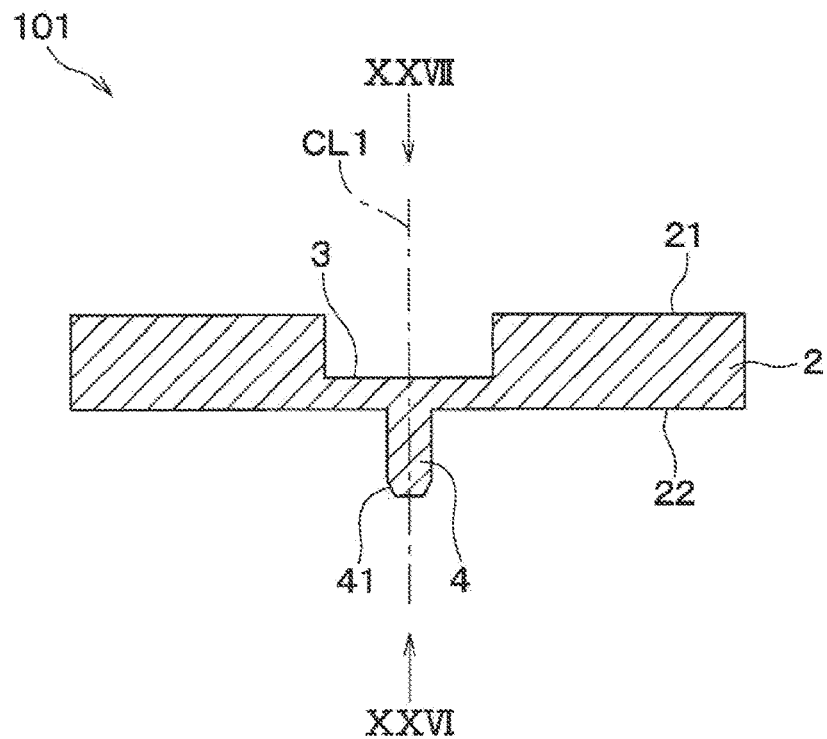
FIG. 25 is a cross-sectional view of a pressed article according to a first comparative example.
Figure 26:
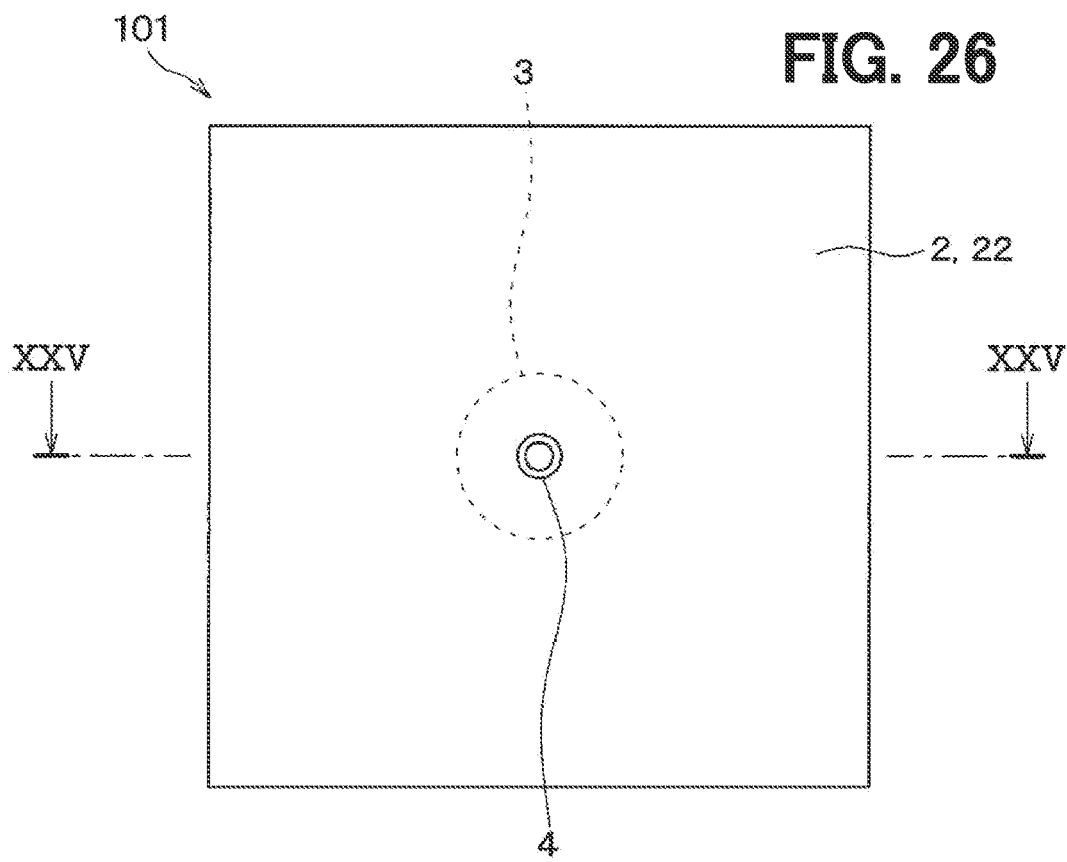
FIG. 26 is a view taken in a direction of an arrow XXVI in FIG. 25.
Figure 27:
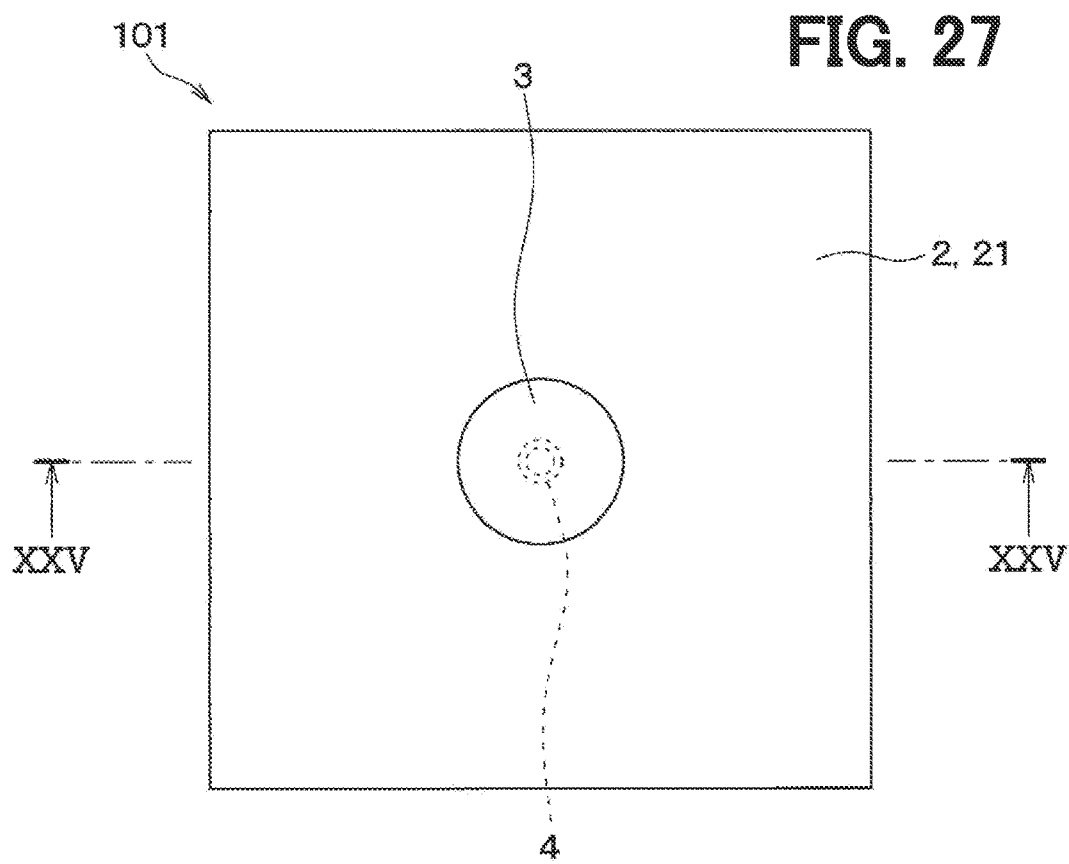
FIG. 27 is a view taken in a direction of an arrow XXVII in FIG. 25.

As illustrated in FIGS. 25 to 27, the pressed article 101 according to the first comparative example includes the main body 2, the recess portion 3, and the pin 4. However, the pressed article 101 according to the first comparative example does not include the groove portion 5.

Figure 31:
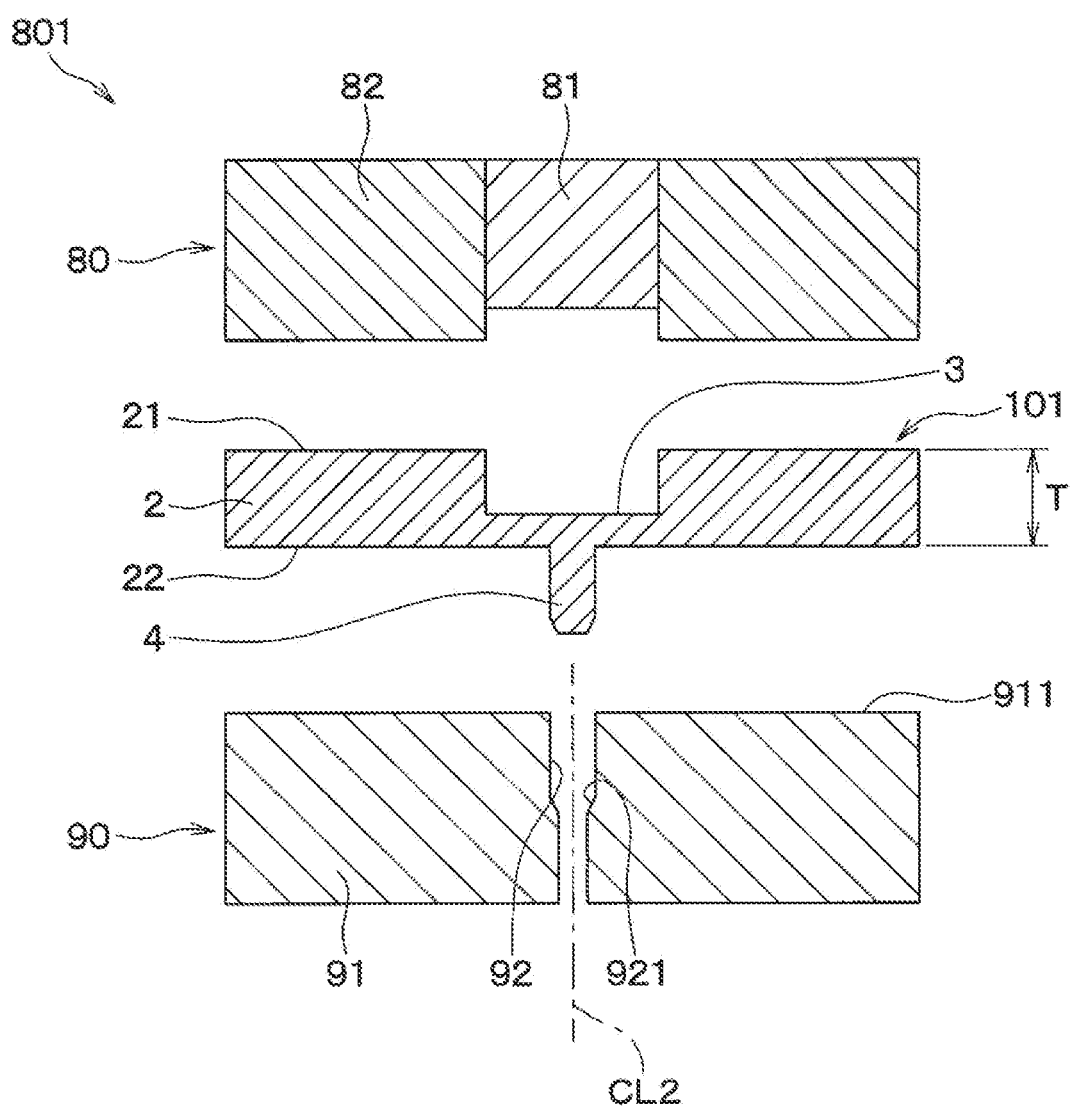
FIG. 31 is a diagram illustrating a manufacturing process of the pressed article according to the first comparative example.

FIG. 31 illustrates the pressing device 801 for manufacturing the pressed article 101 according to the first comparative example.

As illustrated in FIG. 31, the pressing device 801 according to the first comparative example also includes the first mold 80 including the punch 81 and the stripper 82, and the second mold 90 including the base portion 91 and the hole portion 92. However, the second mold 90 of the pressing device 801 according to the first comparative example does not include the protrusion 93.

A press working process performed by the pressing device 801 according to the first comparative example will be described with reference to FIGS. 28 to 31.

Figure 28:
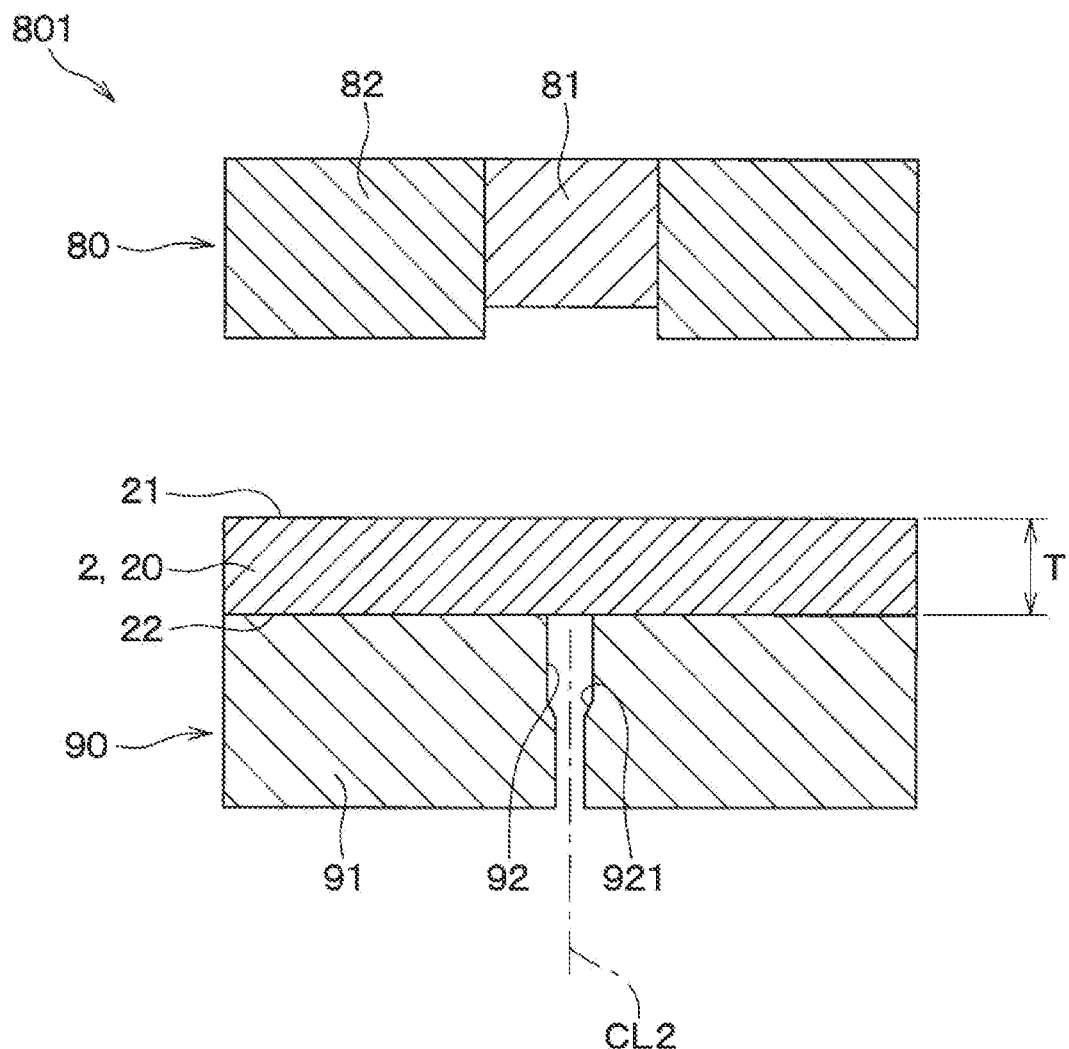
FIG. 28 is a diagram illustrating a manufacturing process of the pressed article according to the first comparative example.

First, as illustrated in FIG. 28, the pressing device 801 including the first mold 80 and the second mold 90 is prepared, and the workpiece 20 is placed between the first mold 80 and the second mold 90.

Figure 29:
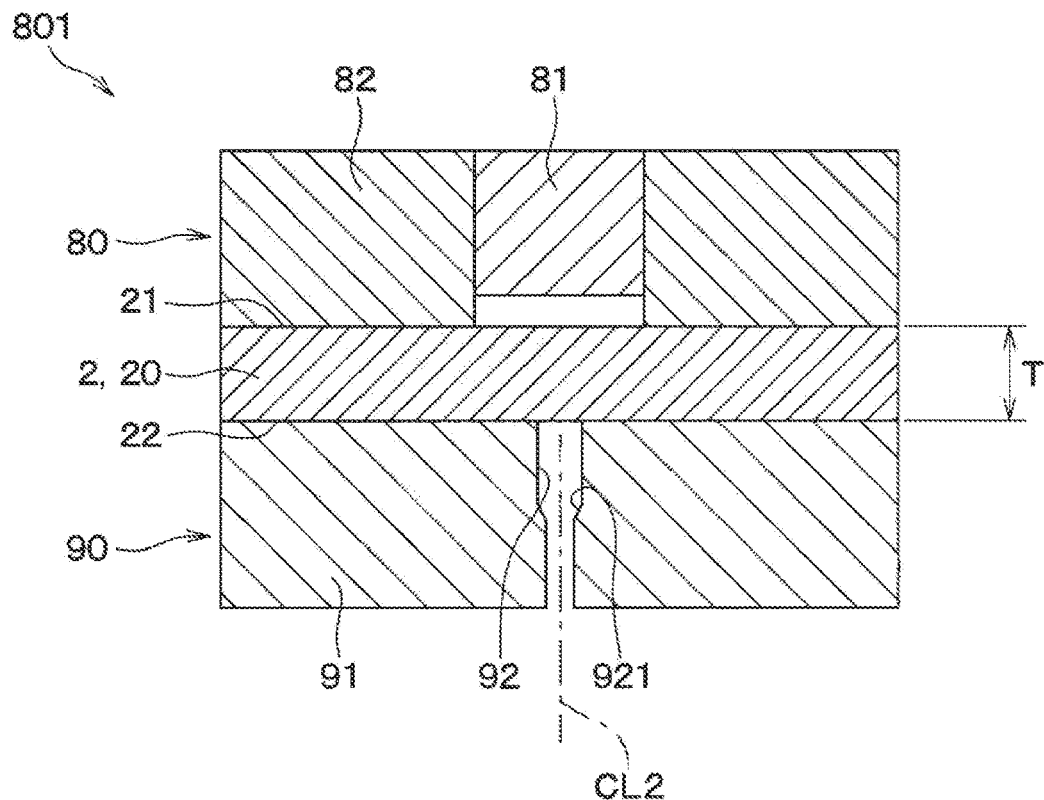
FIG. 29 is a diagram illustrating a manufacturing process of the pressed article according to the first comparative example.

Next, as illustrated in FIG. 29, the first mold 80 is moved toward the second mold 90.

Figure 30:
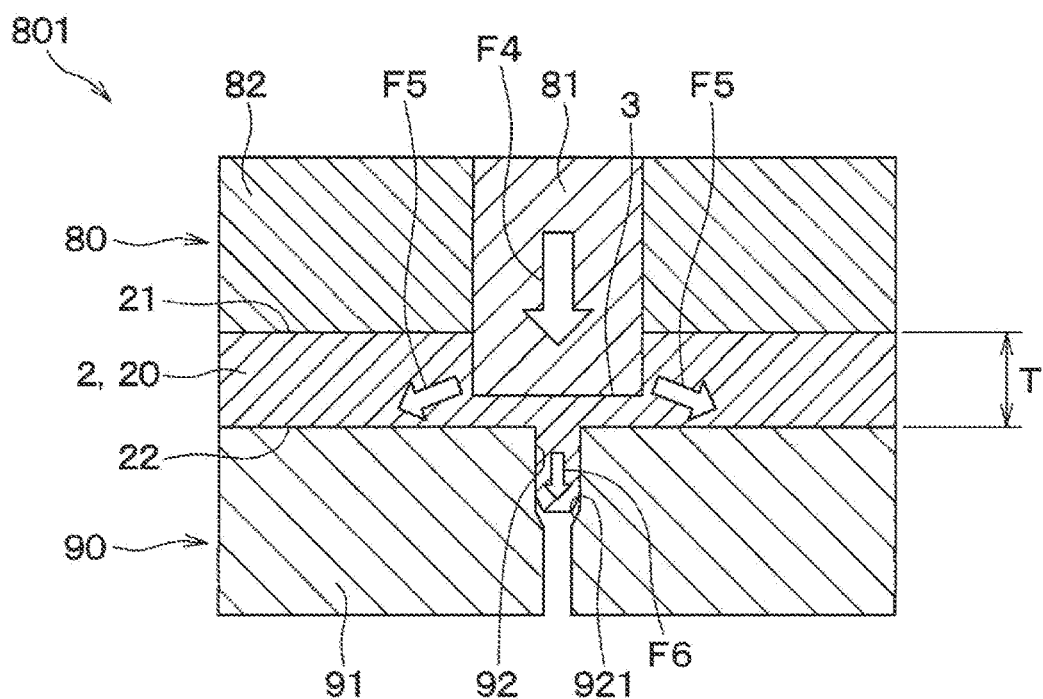
FIG. 30 is a diagram illustrating a manufacturing process of the pressed article according to the first comparative example.

Subsequently, as indicated by an arrow F4 in FIG. 30, the punch 81 is driven into the workpiece 20, the recess portion 3 is formed in the first surface 21, and the pin 4 is formed on an opposite side. At this time, in the pressing device 801 according to the first comparative example, as indicated by arrows F5, most of the material of the main body 2 that is the workpiece 20 flows in the surface direction of the second surface 22 due to the pressing force of the punch 81. Therefore, as indicated by an arrow F6, the propulsive force for extruding the material of the workpiece 20 into the hole portion 92 of the second mold 90 is reduced. In the first comparative example, since the hole portion 92 also has a constant inner diameter from the inlet side to the large diameter side of the tapered portion 921, the frictional resistance between the material of the workpiece 20 extruded inside the hole portion 92 and the inner wall of the hole portion 92 is large. Therefore, in the first comparative example, the material of the workpiece 20 does not sufficiently enter the hole portion 92 of the second mold 90, and the pin 4 is formed to be low.

Thereafter, as illustrated in FIG. 31, the pressed article 101 according to the first comparative example is removed from between the first mold 80 and the second mold 90.

When the pressed article 101 according to the first comparative example and another component are caulked and connected to each other, since the pressed article 101 according to the first comparative example includes the pin 4 formed to be lower than that in the first embodiment, the strength of the caulking connection may be weakened.

<Relation Between Position of Protrusion of Mold and Height of Pin>

Next, regarding the pressing device 8 and the pressed article 1, a result obtained by analyzing the relation between a position of the protrusion 93 of the second mold 90 and a height of the pin 4 will be described with reference to a graph of FIG. 10A and a diagram of FIG. 10B. FIG. 10B is the diagram illustrating an analysis condition.

Figure 10A:
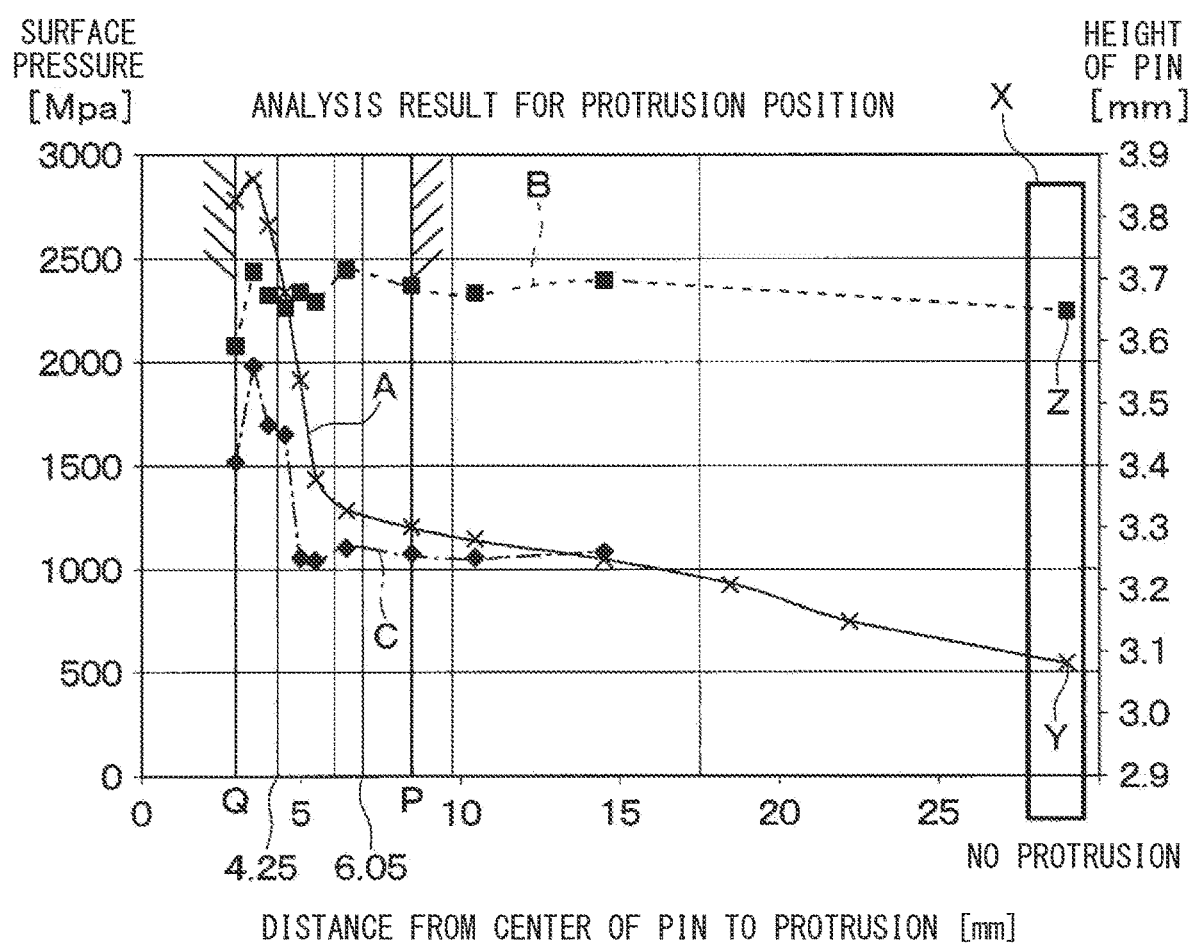
FIG. 10A is a graph illustrating a relation between a position of a protrusion of a second mold and a height of a pin of the pressed article in press working according to the first embodiment.
Figure 10B:
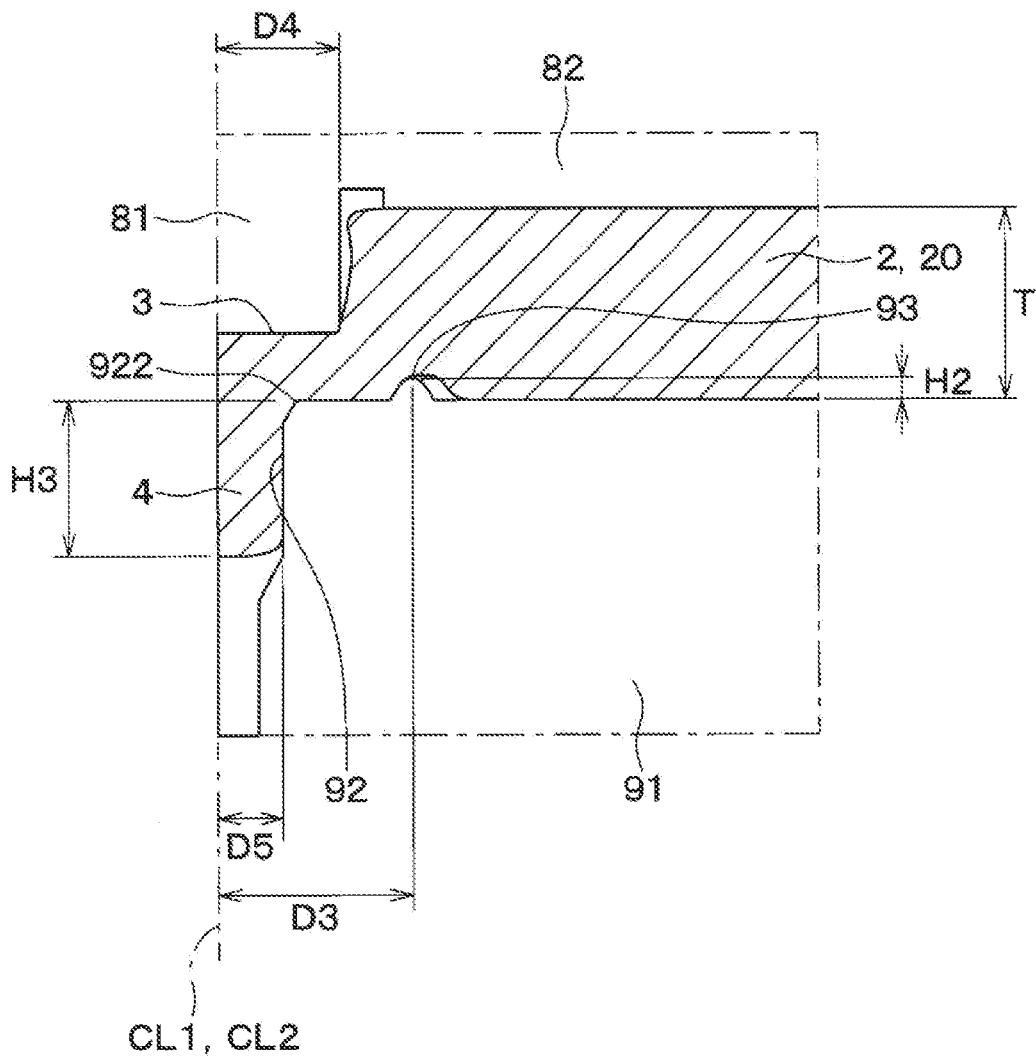
FIG. 10B is a diagram illustrating an analysis condition.

A horizontal axis of the graph in FIG. 10A represents a distance D3 between the axis center CL1 of the pin 4 (that is, the axis center CL2 of the hole portion 92 of the second mold 90) and a center of the protrusion 93 of the second mold 90. A left vertical axis of the graph represents a surface pressure, and a right vertical axis represents a height H3 of the pin 4.

In this analysis, the plate thickness T of the main body 2 of the pressed article 1 (that is, the plate thickness of the workpiece 20) is 4.2 mm, a radius D4 of the punch 81 is 2.75 mm (that is, a diameter of the punch 81 is 5.5 mm), a radius D5 of the pin 4 is 1.5 mm (that is, a diameter of the pin 4 is 3 mm), and the height H2 of the protrusion 93 is 0.5 mm.

In the graph of FIG. 10A, a solid line A indicates the height H3 of the pin 4, a dashed line B indicates a surface pressure acting on an inlet 922 of the hole portion 92 (that is, a base portion of the pin 4) during press working, and an alternate long and short dash line C indicates a surface pressure acting on the protrusion 93 during press working.

In the graph of FIG. 10A, a dot Y at a right end of the solid line A indicated in a right frame X and a dot Z at a right end of the dashed line B indicate the state where the protrusion 93 of the second mold 90 is not present (that is, the pressed article 101 does not include the groove portion 5) as in the first comparative example.

As indicated by the solid line A, the height H3 of the pin 4 is extended when the protrusion 93 is provided in the second mold 90, and is rapidly increased when the distance D3 between the axis center CL1 of the pin 4 and the center of the protrusion 93 of the second mold 90 becomes smaller than 6 mm.

As indicated by the dashed line B, the surface pressure acting on the inlet 922 of the hole portion 92 during press working is substantially constant.

As indicated by the alternate long and short dash line C, the surface pressure acting on the protrusion 93 during press working increases when the distance D3 between the axis center CL1 of the pin 4 and the center of the protrusion 93 of the second mold 90 becomes smaller than 5 mm.

When the distance D3 between the axis center CL1 of the pin 4 and the center of the protrusion 93 of the second mold 90 is 3 mm or less, all the numerical values are lower than 3.5 mm.

As indicated by the solid line A in FIG. 10A, at a point P indicated on the horizontal axis, the height H3 of the pin 4 is higher by 15% or more than the height H3 of the pin 4 indicated by the dot Y at the right end of the solid line A indicated in the right frame X. When the height H3 of the pin 4 of the pressed article 1 is set to be higher than that of the first comparative example by 15% or more, sufficient caulking strength can be obtained when the pressed article 1 and another member are caulked and connected to each other. Therefore, the distance D3 between the axis center CL1 of the pin 4 and the center of the protrusion 93 of the second mold 90 is preferably set at a position closer to the axis center CL1 of the pin 4 than the point P illustrated on the horizontal axis. The point P illustrated on the horizontal axis is a position obtained by adding a distance of 1.5 times the plate thickness T of the main body 2 to the radius of the circumscribed circle of the punch 81. Specifically, in the example shown in this analysis, at the point P, the distance D3 between the axis center CL1 of the pin 4 and the center of the protrusion 93 of the second mold 90 is 8.75 mm.

On the other hand, at a point Q illustrated on the horizontal axis, the height H3 of the pin 4 is higher by about 25% than the height H3 of the pin 4 indicated by the dot Y at the right end of the solid line A indicated in the right frame X. However, when the protrusion 93 is brought closer to the axis center CL1 of the pin 4, the pin 4 tends to be lowered. Therefore, the distance D3 between the axis center CL1 of the pin 4 and the center of the protrusion 93 of the second mold 90 is preferably set at a position farther from the axis center CL1 of the pin 4 than the point Q illustrated on the horizontal axis. The point Q illustrated on the horizontal axis is a position that coincides with the radius of the inscribed circle of the punch 81. Specifically, in the example shown in this analysis, at the point Q, the distance D3 between the axis center CL1 of the pin 4 and the center of the protrusion 93 of the second mold 90 is 2.75 mm.

As described above, in the pressing device 8, the position where the protrusion 93 is provided is set in the area outside the inscribed circle of the shape of the punch 81 and on an inner side of the position obtained by adding the distance of 1.5 times the plate thickness T of the main body 2 to the radius of the circumscribed circle of the shape of the punch 81, when viewed in the plate thickness direction of the main body 2.

That is, in the pressed article 1, the position where the groove portion 5 is provided is set in the area outside the inscribed circle of the shape of the recess portion 3 and on an inner side of the position obtained by adding the distance of 1.5 times the plate thickness T of the main body 2 to the radius of the circumscribed circle of the shape of the recess portion 3, when viewed in the plate thickness direction of the main body 2.

Here, inscribed circles and circumscribed circles of the shapes of the recess portion 3 and the punch 81 will be described.

As described above, a shape of each part of the pressed article 1 and the pressing device 8 described in the first embodiment is an example, and the present invention is not limited thereto. That is, the shape of the recess portion 3 of the pressed article 1 and the shape of the punch 81 of the pressing device 8 are not limited to a columnar shape, and various shapes are conceivable.

Figure 11:
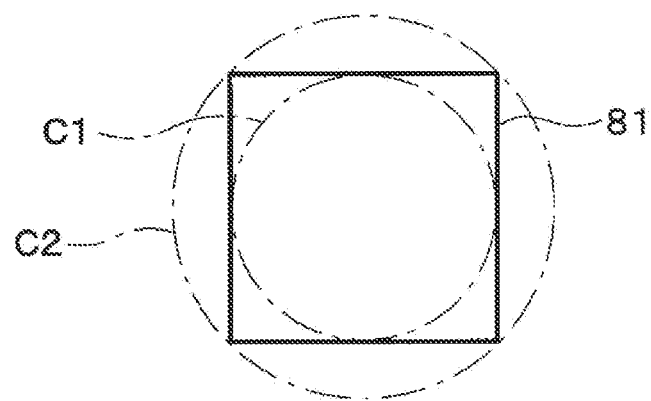
FIG. 11 is a view of a punch of a pressing device according to a first modification when viewed in a moving direction of the punch.
Figure 12:
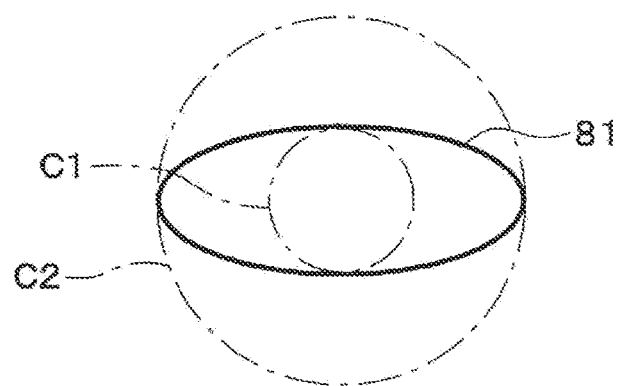
FIG. 12 is a view of a punch of a pressing device according to a second modification when viewed in a moving direction of the punch.
Figure 13:
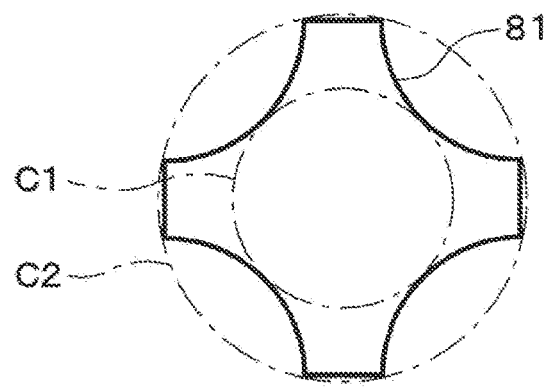
FIG. 13 is a view of a punch of a pressing device according to a third modification when viewed in a moving direction of the punch.

FIGS. 11 to 13 illustrate modifications of the shape of the punch 81 of the pressing device 8 described in the first embodiment. Each of FIGS. 11 to 13 illustrates a shape of the punch 81 of the pressing device 8 when viewed in a moving direction of the punch 81. The moving direction of the punch 81 is the same as the plate thickness direction of the main body 2.

As illustrated in FIG. 11, in a first modification, the punch 81 is formed in a quadrangular shape. As illustrated in FIG. 12, in a second modification, the punch 81 is formed in an elliptical shape. As illustrated in FIG. 13, in a third modification, the punch 81 has a substantially + (plus) symbol shape, and is formed by four arcs which are recessed toward a center and four straight lines which connect end portions of the four arcs.

In FIGS. 11 to 13, when viewed in the moving direction of the punch 81, the inscribed circle of the shape of the punch 81 is indicated by an alternate long and short dash line C1, and the circumscribed circle of the shape of the punch 81 is indicated by an alternate long and short dash line C2. As described above, the shape of the punch 81 is not limited to a circle, and when the punch 81 is set to various shapes, the position where the protrusion 93 of the pressing device 8 is provided can also be set based on the inscribed circle and the circumscribed circle of the shape.

Since the shape of the recess portion 3 of the pressed article 1 corresponds to the shape of the punch 81 of the pressing device 8, the same can be considered. That is, the shape of the recess portion 3 of the pressed article 1 is not limited to a circle, and when the recess portion 3 is set to various shapes, the position where the groove portion 5 of the pressed article 1 is provided can also be set based on the inscribed circle and the circumscribed circle of the shape.

Operation and Effect of First Embodiment

The pressed article 1, the pressing device 8, and the pressing method according to the first embodiment described above have the following operations and effects.

(1) The pressed article 1 according to the first embodiment includes the groove portion 5 that is provided in the second surface 22 of the main body 2 to surround at least a part of the periphery of the pin 4.

When the pressed article 1 having this shape is manufactured by press working, the first mold 80 including the punch 81 and the stripper 82, and the second mold 90 including the hole portion 92 and the protrusion 93 are prepared. Then, the main body 2 that is the workpiece 20 is placed between the first mold 80 and the second mold 90, the punch 81 is driven into the first surface 21 of the main body 2, thus a material is extruded from the hole portion 92, and the pin 4 is formed on the second surface 22. At this time, since the flow of the material of the main body 2 in the surface direction of the second surface 22 due to the pressing force of the punch 81 is blocked by the protrusion 93 of the second mold 90, the propulsive force for extruding the material of the main body 2 into the hole portion 92 of the second mold 90 is increased. Therefore, when the pressed article 1 having this shape is manufactured by press working, the straightness of the pin 4 can be ensured, and the pin 4 can be formed to be high.

(2) In the pressed article 1 according to the first embodiment, the position where the groove portion 5 is provided is in the area outside the inscribed circle of the shape of the recess portion 3 and on an inner side of the position obtained by adding the distance of 1.5 times the plate thickness T of the main body 2 to the radius of the circumscribed circle of the shape of the recess portion 3, when viewed in the plate thickness direction of the main body 2.

Accordingly, as compared with the pressed article 101 according to the first comparative example in which the groove portion 5 is not included, the straightness of the pin 4 can be ensured and the pin 4 can be formed to be high in the pressed article 1 according to the first embodiment. Specifically, according to an analysis and an experiment performed by an inventor, the height H3 of the pin 4 of the pressed article 1 according to the first embodiment can be formed to be higher by 15% or more than that of the pressed article 101 according to the first comparative example.

(3) The depth H1 of the groove portion 5 of the pressed article 1 according to the first embodiment is in the range of 2% to 20%, more preferably the range of 8% to 15% of the plate thickness T of the main body 2.

Accordingly, when the pressed article 1 is manufactured, the flow of the material of the main body 2 in the surface direction of the second surface 22 due to the pressing force of the punch 81 is effectively blocked by the protrusion 93 of the second mold 90, and the propulsive force for extruding the material of the main body 2 into the hole portion 92 of the second mold 90 can be increased.

(4) The groove portion 5 of the pressed article 1 according to the first embodiment has such tapered inner wall surfaces 51 and 52 that the width of the groove portion 5 gradually decreases from the second surface 22 toward the first surface 21 in the cross-sectional view parallel to the plate thickness direction of the main body 2.

Accordingly, when the pressed article 1 is manufactured, the main body 2 is placed between the first mold 80 and the second mold 90, and the stripper 82 is pressed against the first surface 21 of the main body 2, and thus the protrusion 93 of the second mold 90 can be easily and reliably pushed into the second surface 22 of the main body 2.

(5) In the pressed article 1 according to the first embodiment, the distance D1 between the recess portion 3 and the groove portion 5 is larger than the distance D2 between the recess portion 3 and the second surface 22 in the cross-sectional view parallel to the plate thickness direction of the main body 2.

Accordingly, since a thickness of the main body 2 is prevented from being minimized between the recess portion 3 and the groove portion 5, the strength of the pressed article 1 can be ensured.

(6) The first mold 80 of the pressing device 8 according to the first embodiment includes the punch 81 configured to form the recess portion 3 in the first surface 21 of the main body 2, and the stripper 82 configured to press the first surface 21 outside the punch 81. The second mold 90 includes the hole portion 92 provided at the position corresponding to the punch 81 and configured to form the pin 4 on the second surface 22, and the protrusion 93 protruding from the base portion 91 toward the first mold 80, provided to surround at least a part of the periphery of the hole portion 92, and configured to form the groove portion 5 in the second surface 22.

Accordingly, when the pressed article 1 is manufactured by the pressing device 8, the flow of the material of the main body 2 that is the workpiece 20 in the surface direction of the second surface 22 due to the pressing force of the punch 81 is blocked by the protrusion 93 of the second mold 90. Thus, the propulsive force for extruding the material of the main body 2 into the hole portion 92 of the second mold 90 is increased. Therefore, the pressing device 8 can ensure the straightness of the pin 4 formed in the pressed article 1 and can form the pin 4 to be high.

(7) In the pressing device 8 according to the first embodiment, the position of the protrusion 93 of the second mold 90 is in the area outside the inscribed circle of the shape of the punch 81 and on an inner side of the position obtained by adding the distance of 1.5 times the plate thickness T of the main body 2 to the radius of the circumscribed circle of the shape of the punch 81, when viewed in the plate thickness direction of the main body 2.

Accordingly, as compared with the pressing device 801 according to the first comparative example in which the protrusion 93 is not included, the pressing device 8 according to the first embodiment can ensure the straightness of the pin 4 of the pressed article 1 and form the pin 4 to be high. Specifically, according to an analysis and an experiment performed by an inventor, the height H3 of the pin 4 can be formed by the pressing device 8 according to the first embodiment to be higher by 15% or more than that formed by the pressing device 801 according to the first comparative example.

(8) In the pressing device 8 according to the first embodiment, the height H2 of the protrusion 93 of the second mold 90 is in the range of 2% to 20%, more preferably the range of 8% to 15% of the plate thickness T of the main body 2.

Accordingly, when the press working is performed, the flow of the material of the main body 2 in the surface direction of the second surface 22 due to the pressing force of the punch 81 is effectively blocked by the protrusion 93 of the second mold 90, and the propulsive force for extruding the material of the main body 2 into the hole portion 92 of the second mold 90 can be increased.

(9) In the pressing device 8 according to the first embodiment, the protrusion 93 of the second mold 90 has such tapered outer wall surfaces 94 and 95 that the width of the protrusion 93 gradually decreases from the base portion 91 toward the first mold 80 in the cross-sectional view parallel to the plate thickness direction of the main body 2.

Accordingly, when the press working is performed, the main body 2 is placed between the first mold 80 and the second mold 90, the stripper 82 is pressed against the first surface 21 of the main body 2, and thus the protrusion 93 of the second mold 90 can be easily and reliably pushed into the second surface 22 of the main body 2.

(10) In the pressing device 8 according to the first embodiment, the distance between the punch 81 and the protrusion 93 is larger than the distance between the punch 81 and the base portion 91 in a state where the punch 81 is closest to the base portion 91 during the press working.

Accordingly, in the pressed article 1 manufactured by the pressing device 8, since the thickness of the main body 2 is prevented from being minimized between the recess portion 3 and the groove portion 5, the strength of the pressed article 1 can be ensured.

(11) In the pressing method according to the first embodiment, the main body 2 of the pressed article 1 that is the workpiece 20 is placed between the first mold 80 and the second mold 90 of the pressing device 8. Then, the stripper 82 is moved toward the second mold 90, and at least a part of the groove portion 5 is formed in the second surface 22 by the protrusion 93. Thereafter, the stripper 82 is further moved toward the second mold 90, the groove portion 5 is formed in the second surface 22 by the protrusion 93, the punch 81 is moved toward the second mold 90, the recess portion 3 is formed in the first surface 21, and the pin 4 is formed by the hole portion 92. Subsequently, the first mold 80 is moved away from the second mold 90, and the pressed article 1 is removed from between the first mold 80 and the second mold 90.

According to the pressing method, when the punch 81 is driven into the material of the main body 2, the flow of the material of the main body 2 in the surface direction of the second surface 22 due to the pressing force of the punch 81 is blocked by the protrusion 93 forming the groove portion 5 in the previous step. Thus, the propulsive force for extruding the material of the main body 2 into the hole portion 92 of the second mold 90 is increased. Therefore, according to the pressing method, the straightness of the pin 4 formed in the pressed article 1 can be ensured, and the pin 4 can be formed to be high.

Second Embodiment

The pressed article 1, the pressing device 8, and a pressing method according to a second embodiment will be described. The pressed article 1 according to the second embodiment is obtained by adding a pedestal portion to a configuration of the pressed article 1 according to the first embodiment, and others are the same as those in the first embodiment. The pressing device 8 according to the second embodiment is obtained by adding a pedestal forming portion to a configuration of the pressing device 8 according to the first embodiment, and others are the same as those in the first embodiment.

<Configuration of Pressed Article>

Figure 14:
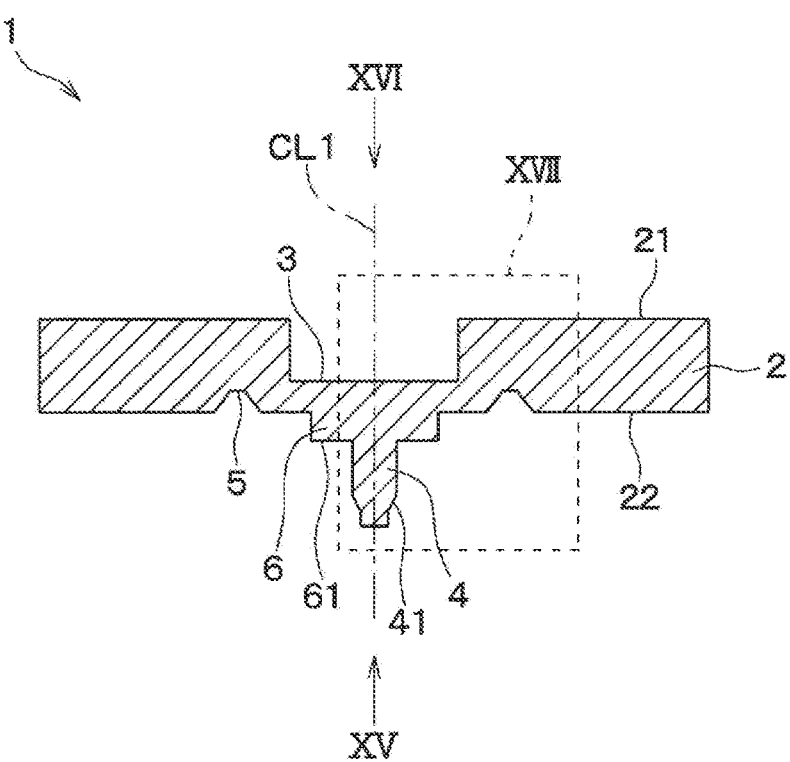
FIG. 14 is a cross-sectional view of a pressed article according to a second embodiment.
Figure 15:
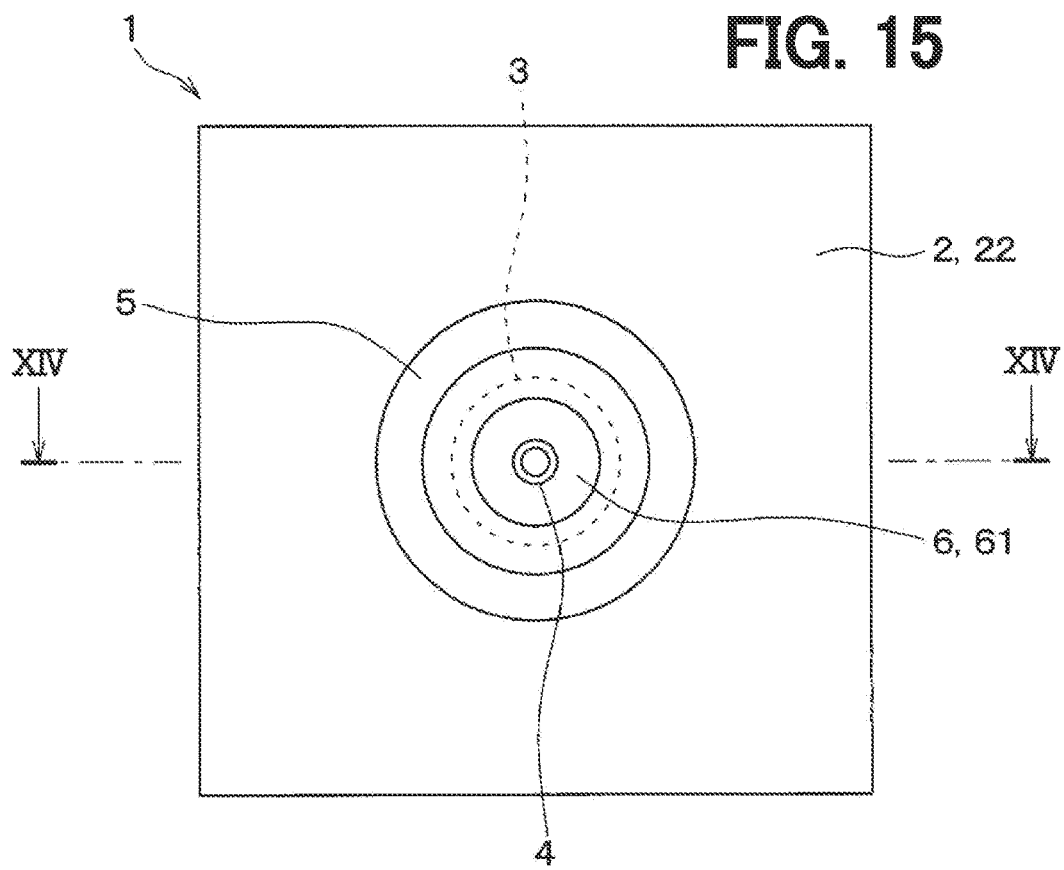
FIG. 15 is a view taken in a direction of an arrow XV in FIG. 14.
Figure 16:
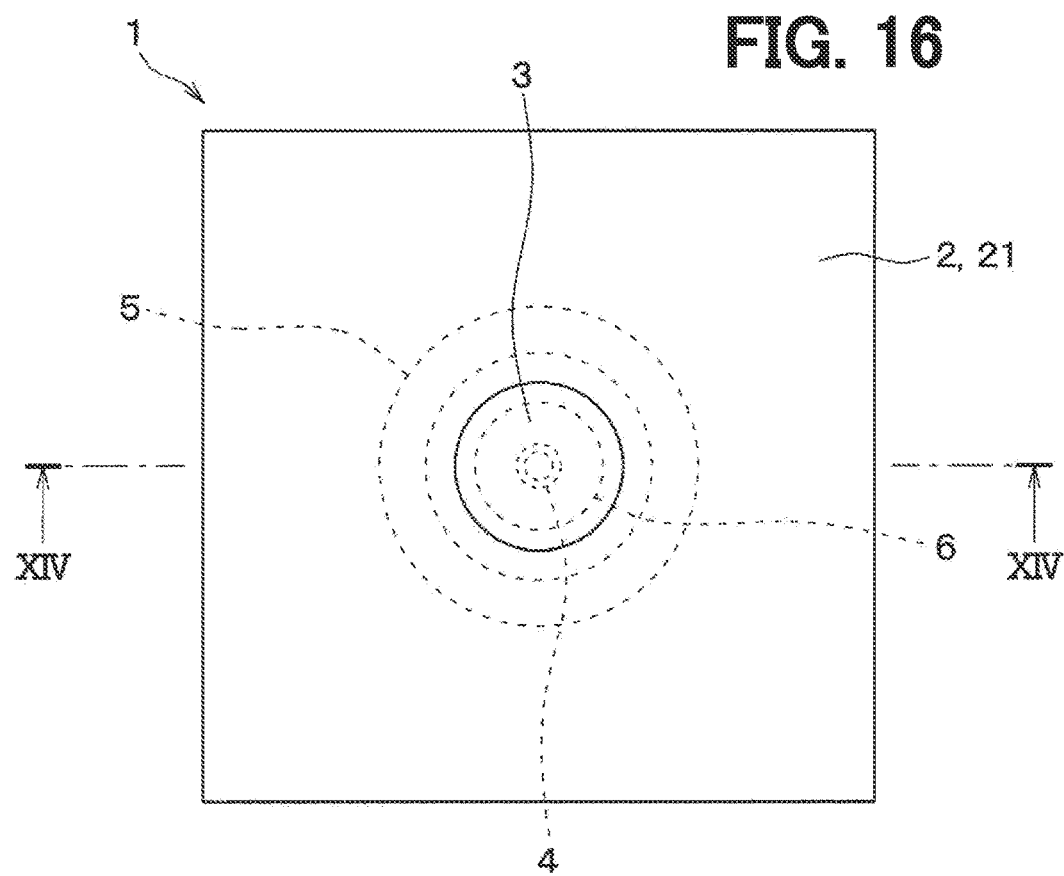
FIG. 16 is a view taken in a direction of an arrow XVI in FIG. 14.

As illustrated in FIGS. 14 to 16, the pressed article 1 includes the main body 2, the recess portion 3, the pin 4, a pedestal portion 6, and the groove portion 5, and is integrally formed of metal.

The main body 2 is a plate-shaped member. A surface of the main body 2 facing one side in a plate thickness direction of the main body 2 is referred to as the first surface 21, and a surface of the main body 2 facing the other side in the plate thickness direction is referred to as the second surface 22. The recess portion 3 is provided in the first surface 21 of the main body 2, and the pin 4, the pedestal portion 6, and the groove portion 5 are provided in the second surface 22 of the main body 2.

The recess portion 3 is a portion recessed from the first surface 21 of the main body 2 toward the second surface 22. The recess portion 3 is formed to be recessed, for example, in a columnar shape. A shape and a size of the recess portion 3 are the same as or larger than a shape and a size of the pedestal portion 6 when viewed in the plate thickness direction of the main body 2.

The pin 4 protrudes from the second surface 22 of the main body 2 in the plate thickness direction of the main body 2. The pin 4 is provided at a position corresponding to the recess portion 3. Specifically, an axis center CL1 of the pin 4 and a center of the recess portion 3 may be located at substantially the same position or slightly shifted from each other. The pin 4 is formed in a columnar shape, for example, and has a shape in which an outer periphery 41 of a tip portion thereof is chamfered. When viewed in the plate thickness direction of the main body 2, an outer shape of the pin 4 is formed to be smaller than an outer shape of the recess portion 3.

The pedestal portion 6 is provided in the periphery of the pin 4 and protrudes from the second surface 22 in the plate thickness direction of the main body 2. A height at which the pedestal portion 6 protrudes from the second surface 22 is significantly smaller than a height at which the pin 4 protrudes from the second surface 22. The shape and the size of the pedestal portion 6 are the same as or larger than the shape and the size of the recess portion 3 when viewed in the plate thickness direction of the main body 2. A surface 61 of the pedestal portion 6 facing the plate thickness direction of the main body 2 is formed in a plane perpendicular to the axis center CL1 of the pin 4. The surface 61 of the pedestal portion 6 facing the plate thickness direction of the main body 2 is a surface to be brought into contact with another member when the pressed article 1 according to the second embodiment and the other member (not shown) are caulked and connected to each other.

The groove portion 5 is a groove that is recessed from the second surface 22 of the main body 2 toward the first surface 21 and is provided to surround at least a part of the periphery of the pin 4 and the pedestal portion 6. In the second embodiment, the groove portion 5 is provided outside the pedestal portion 6 and the recess portion 3, and surrounds the entire periphery of the pin 4 and the pedestal portion 6. In the second embodiment, the position where the groove portion 5 is provided is also set in the area outside the inscribed circle of the shape of the recess portion 3 and on an inner side of the position obtained by adding the distance of 1.5 times the plate thickness T of the main body 2 to the radius of the circumscribed circle of the shape of the recess portion 3, when viewed in the plate thickness direction of the main body 2. Accordingly, the pin 4 can be formed sufficiently higher than that in a second comparative example described later.

Figure 17:
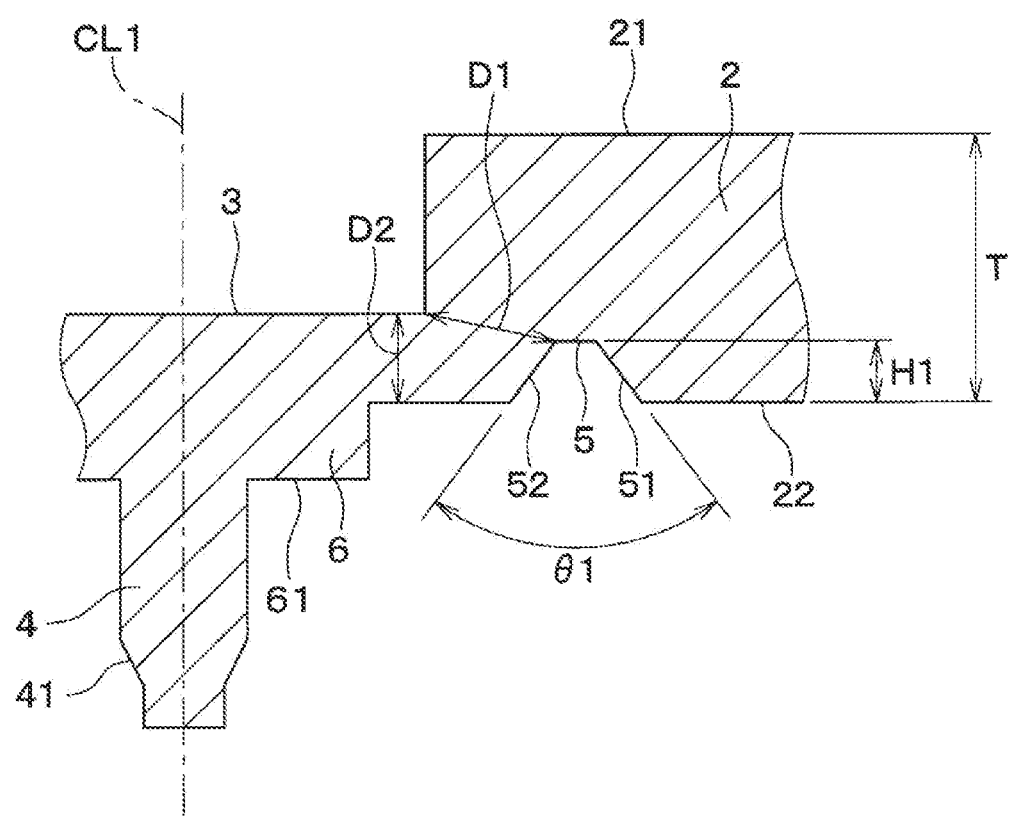
FIG. 17 is an enlarged view of a portion XVII in FIG. 14.

As illustrated in FIGS. 14 and 17, the groove portion 5 has such tapered inner wall surfaces 51 and 52 that the width of the groove portion 5 gradually decreases from the second surface 22 toward the first surface 21 in the cross-sectional view parallel to the plate thickness direction of the main body 2. The taper angle 61 is in the range of 40° to 80°, more preferably a range of 55° to 65°. The depth H1 of the groove portion 5 is in the range of 2% to 20%, more preferably the range of 8% to 15% of the plate thickness T of the main body 2.

The distance D1 between the recess portion 3 and the groove portion 5 is larger than the distance D2 between the recess portion 3 and the second surface 22 in the cross-sectional view parallel to the plate thickness direction of the main body 2. Accordingly, since a thickness of the main body 2 is prevented from being minimized between the recess portion 3 and the groove portion 5, the strength of the pressed article 1 can be ensured.

<Configuration of Pressing Device>

Next, the pressing device 8 for manufacturing the pressed article 1 according to the second embodiment will be described with reference to FIG. 21.

Figure 21:
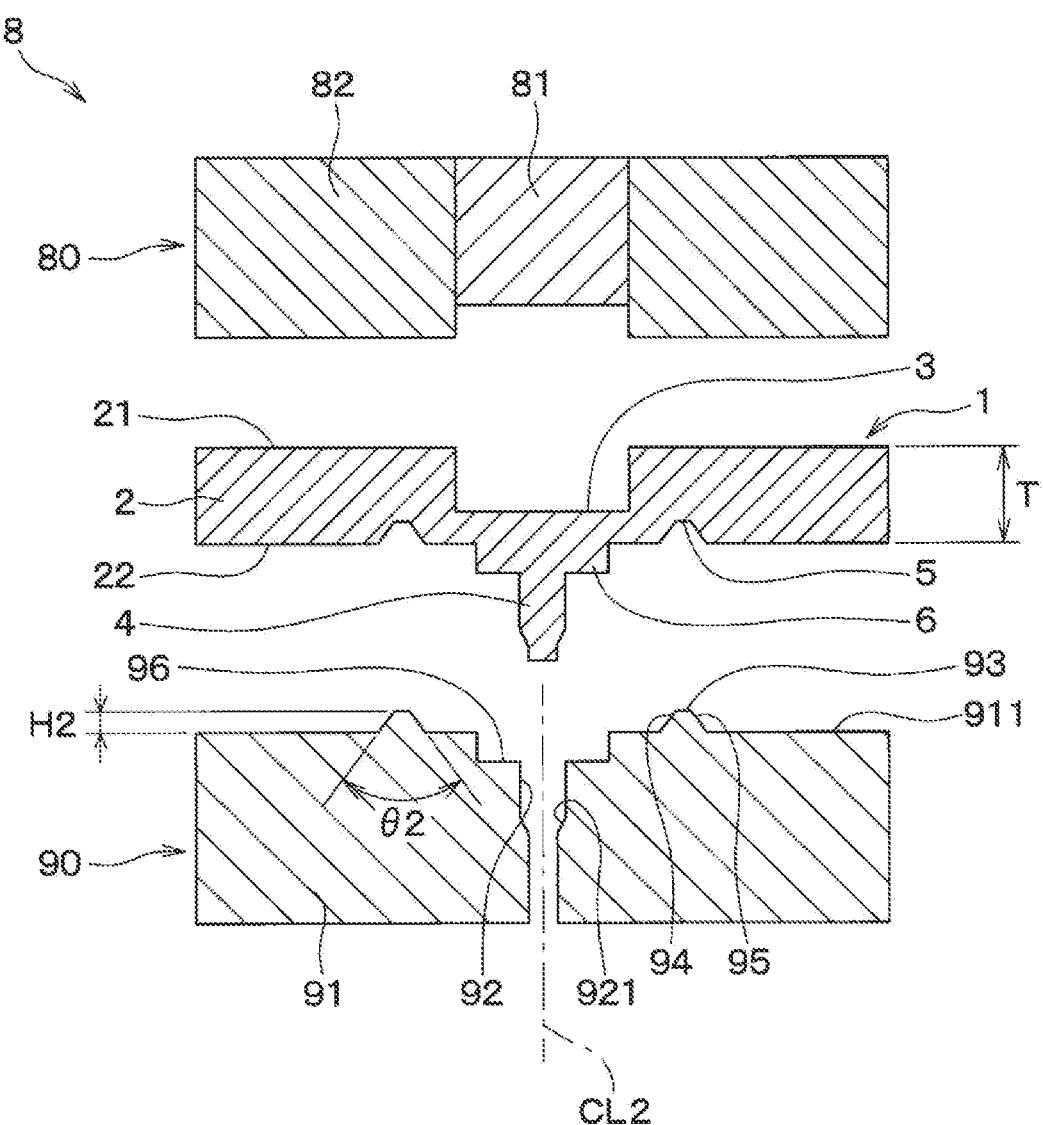
FIG. 21 is a diagram illustrating a manufacturing process of the pressed article according to the second embodiment.

As illustrated in FIG. 21, the pressing device 8 includes the first mold 80 located on the side of the first surface 21 facing the main body 2 of the pressed article 1, and the second mold 90 located on the side of the second surface 22 facing the main body 2.

The first mold 80 includes the punch 81 and the stripper 82.

The punch 81 is a movable mold that forms the recess portion 3 in the first surface 21 of the main body 2. In the second embodiment, the punch 81 also has a columnar shape. When viewed in the plate thickness direction of the main body 2 (that is, when viewed in the moving direction of the first mold 80), a shape and a size of the punch 81 are formed to be the same as or larger than a shape and a size of a pedestal forming portion 96 of the second mold 90. The stripper 82 is a portion that is provided outside the punch 81 to surround the punch 81 and that presses the first surface 21 of the main body 2. The punch 81 and the stripper 82 can be individually moved by a drive device (not illustrated).

The second mold 90 includes the base portion 91, the hole portion 92, the pedestal forming portion 96, and the protrusion 93. The second mold 90 is called a die.

The base portion 91 is a portion having the surface 911 to be brought into contact with the second surface 22 of the pressed article 1. The surface 911 is a surface of the base portion 91 facing the first mold 80.

The hole portion 92 is a through hole for forming the pin 4 of the pressed article 1, and is provided at a position corresponding to the punch 81. The hole portion 92 is formed in, for example, a cylindrical shape, and the tapered portion 921 for forming a chamfered shape at a tip of the pin 4 is provided in the middle of a cylindrical inner wall of the hole portion 92. The tapered portion 921 has a large diameter on a side of the punch 81, and the diameter gradually decreases toward a deep portion. The hole portion 92 has a constant inner diameter from an inlet side (that is, the side of the punch 81) to a large diameter side of the tapered portion 921. When viewed in the plate thickness direction of the main body 2, an outer shape of the hole portion 92 is formed to be smaller than an outer shape of the punch 81. The axis center CL2 of the hole portion 92 is formed perpendicular to a surface of the pedestal forming portion 96 facing the first mold 80. The axis center CL2 of the hole portion 92 is formed parallel to the moving direction of the first mold 80 (that is, the plate thickness direction of the main body 2).

The pedestal forming portion 96 has a hollow shape for forming the pedestal portion 6 of the pressed article 1 and is provided in a periphery of the hole portion 92. A depth of the pedestal forming portion 96 is significantly smaller than a depth from an inlet of the hole portion 92 to the tapered portion 921. A shape and a size of the pedestal forming portion 96 are the same as or larger than the shape and the size of the punch 81 when viewed in the plate thickness direction of the main body 2. A surface of the pedestal forming portion 96 facing the first mold 80 is formed in a plane perpendicular to the axis center CL2 of the hole portion 92.

The protrusion 93 is a portion that forms the groove portion 5 of the pressed article 1, protrudes from the base portion 91 toward the first mold 80, and surrounds at least a part of the periphery of the hole portion 92 and the pedestal forming portion 96. In the second embodiment, the protrusion 93 surrounds the entire periphery of the hole portion 92 and the pedestal forming portion 96. In the second embodiment, the position where the protrusion 93 is provided is also set in the area outside the inscribed circle of the shape of the punch 81 and on an inner side of the position obtained by adding the distance of 1.5 times the plate thickness T of the main body 2 to the radius of the circumscribed circle of the shape of the punch 81, when viewed in the plate thickness direction of the main body 2. Accordingly, the pin 4 can be formed sufficiently higher than that in a second comparative example described later. In the second embodiment, since the punch 81 is also formed in a columnar shape, the inscribed circle and the circumscribed circle of the punch 81 are the same.

Figure 20:
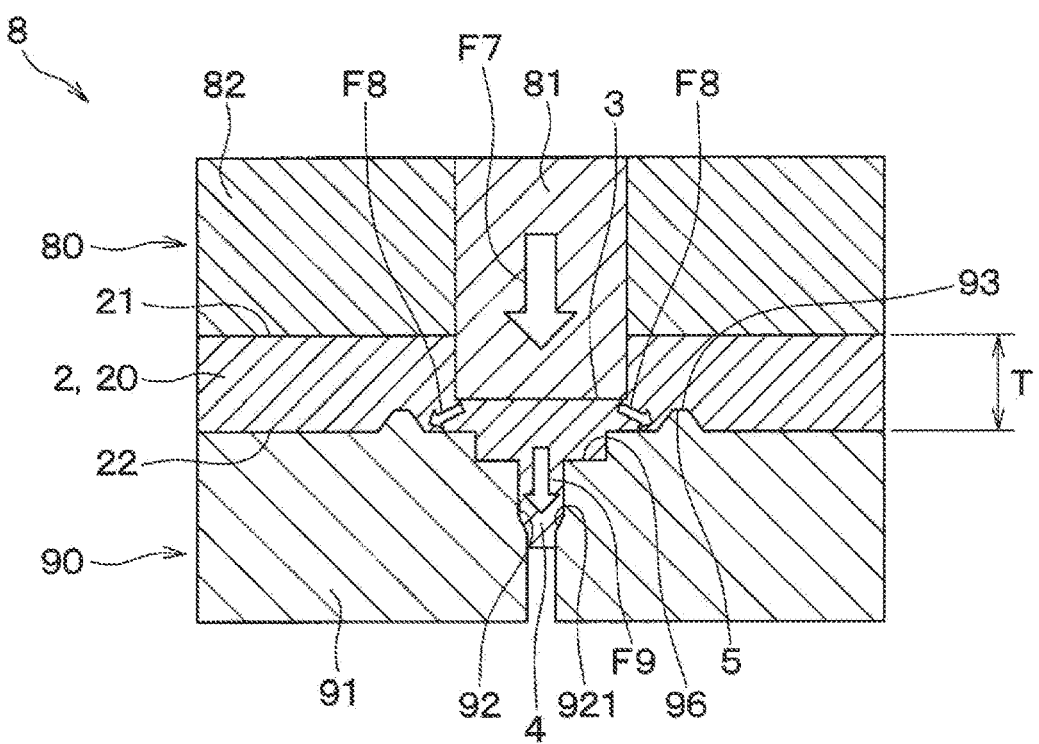
FIG. 20 is a diagram illustrating a manufacturing process of the pressed article according to the second embodiment.

The protrusion 93 has such tapered outer wall surfaces 94 and 95 that a width of the protrusion 93 gradually decreases from the base portion 91 toward the first mold 80 in a cross-sectional view parallel to the plate thickness direction of the main body 2. The taper angle 62 is in a range of 40° to 80°, more preferably a range of 55° to 65°. The height H2 of the protrusion 93 is in the range of 2% to 20%, more preferably the range of 8% to 15% of the plate thickness T of the main body 2. The plate thickness T of the main body 2 coincides with a distance between the stripper 82 and the second mold 90 in a state where the stripper 82 is closest to the second mold 90. As illustrated in FIG. 20, in a state where the punch 81 and the stripper 82 are closest to the second mold 90, the distance between the punch 81 and the protrusion 93 is larger than the distance between the punch 81 and the base portion 91.

<Pressing Method>

Next, a method for manufacturing the pressed article 1 using the pressing device 8 according to the second embodiment will be described with reference to FIGS. 18 to 21.

Figure 18:
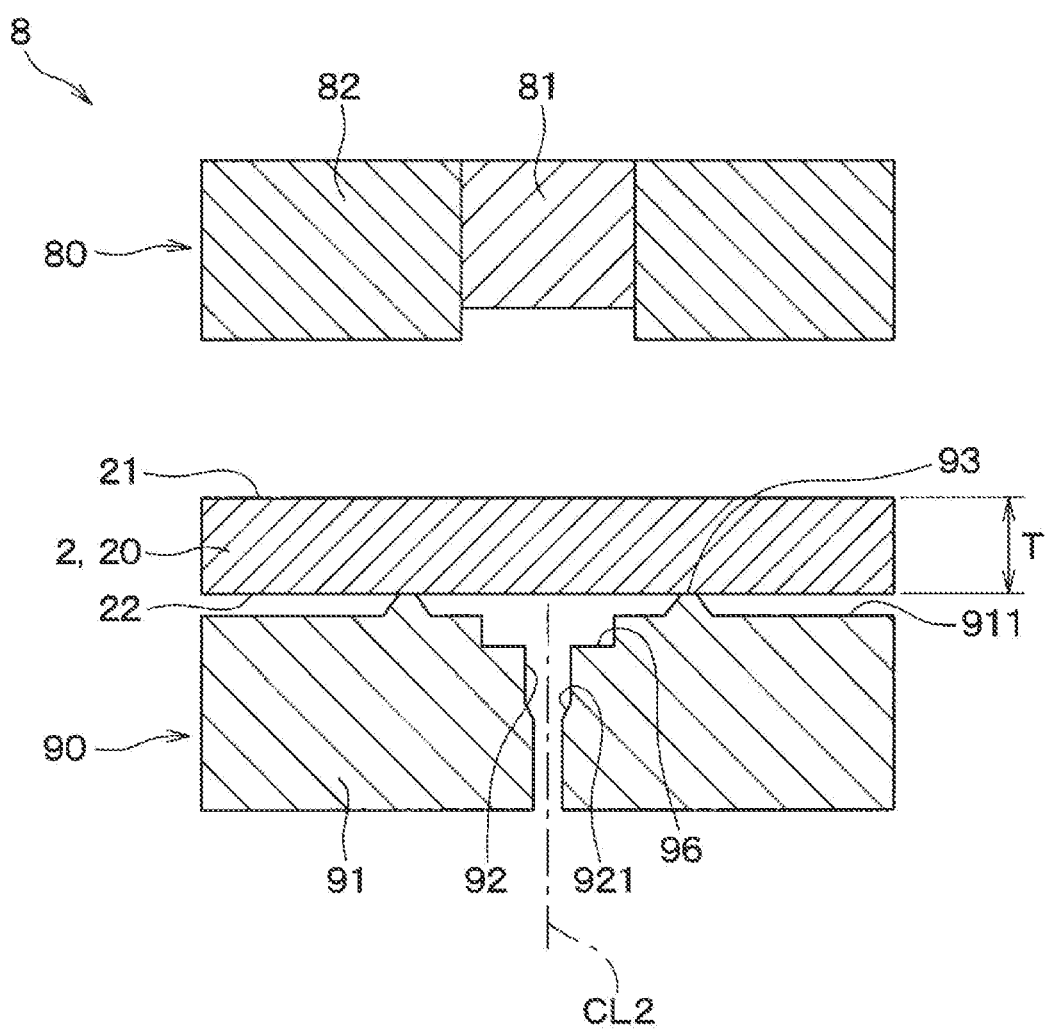
FIG. 18 is a diagram illustrating a manufacturing process of the pressed article according to the second embodiment.

First, as illustrated in FIG. 18, the pressing device 8 including the first mold 80 and the second mold 90 described above is prepared, and the workpiece 20 is placed between the first mold 80 and the second mold 90. The workpiece 20 placed between the first mold 80 and the second mold 90 corresponds to the main body 2 of the pressed article 1. A plate thickness of the workpiece 20 is the same as the plate thickness T of the main body 2 of the pressed article 1.

Figure 19:
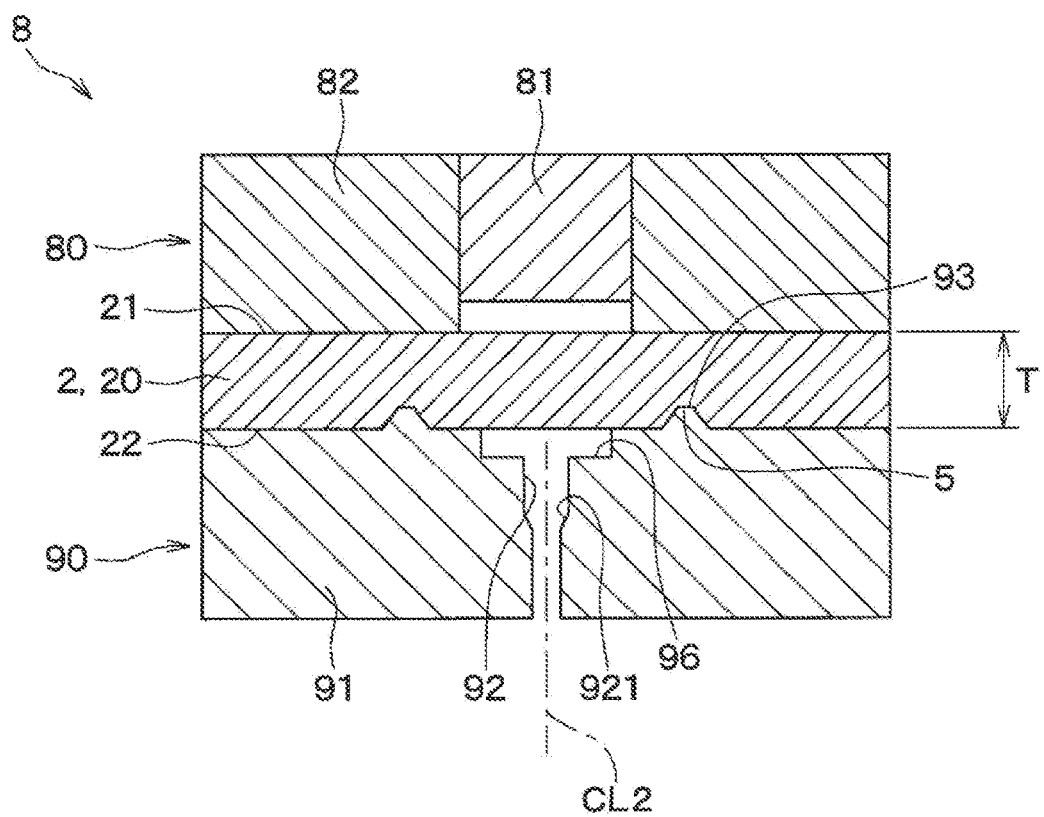
FIG. 19 is a diagram illustrating a manufacturing process of the pressed article according to the second embodiment.

Subsequently, as illustrated in FIG. 19, the stripper 82 of the first mold 80 is moved toward the second mold 90, and the protrusion 93 is pushed into the workpiece 20. The workpiece 20 is pressed toward the second mold 90 by the pressing force of the stripper 82, and the protrusion 93 of the second mold 90 is pushed into the workpiece 20. Accordingly, the groove portion 5 is formed in the second surface 22 of the main body 2 of the pressed article 1.

Next, as illustrated in FIG. 20, the punch 81 is driven into the workpiece 20, and the pedestal portion 6 and the pin 4 are formed on an opposite side. As indicated by an arrow F7 in FIG. 20, when the punch 81 is moved toward the second mold 90 and driven into the main body 2 which is the workpiece 20, and the recess portion 3 is formed in the first surface 21 of the pressed article 1, the workpiece 20 flows and the pedestal portion 6 and the pin 4 are formed on the second surface 22. At this time, as indicated by arrows F8, the flow of the material of the workpiece 20 in the surface direction of the second surface 22 due to the pressing force of the punch 81 is blocked by the protrusion 93 of the second mold 90. Therefore, as indicated by an arrow F9, the propulsive force for extruding the material of the workpiece 20 into the hole portion 92 of the second mold 90 is increased. Therefore, even when the frictional resistance between the material of the workpiece 20 extruded inside the hole portion 92 and the inner wall of the hole portion 92 is large, the pin 4 can be formed to be high. Since the hole portion 92 has a constant inner diameter from the inlet side (that is, the side of the punch 81) to the large diameter side of the tapered portion 921, the straightness of the pin 4 can be ensured.

Thereafter, as illustrated in FIG. 21, the stripper 82 and the punch 81 are moved in the direction away from the second mold 90, and the pressed article 1 is removed from between the first mold 80 and the second mold 90. Thereafter, a finishing process or the like is performed, and the pressed article 1 is completed.

The pin 4 of the pressed article 1 is used when the pressed article 1 and another component (not illustrated) are caulked and connected to each other. In a process for caulking and connecting the pressed article 1 and the other component, the pin 4 of the pressed article 1 is inserted into a hole provided in the other component, and the pedestal portion 6 of the pressed article 1 and the other component are brought into contact with each other. Thereafter, a load is applied to the tip of the pin 4 to deform the tip of the pin 4. Accordingly, the pressed article 1 and the other component are caulked and connected to each other. At this time, since the pin 4 of the pressed article 1 is formed to be high, the strength of caulking connection is high.

Second Comparative Example

Here, in order to compare with the second embodiment described above, a pressed article 102, a pressing device 802, and a pressing method according to a second comparative example will be described.

Figure 32:
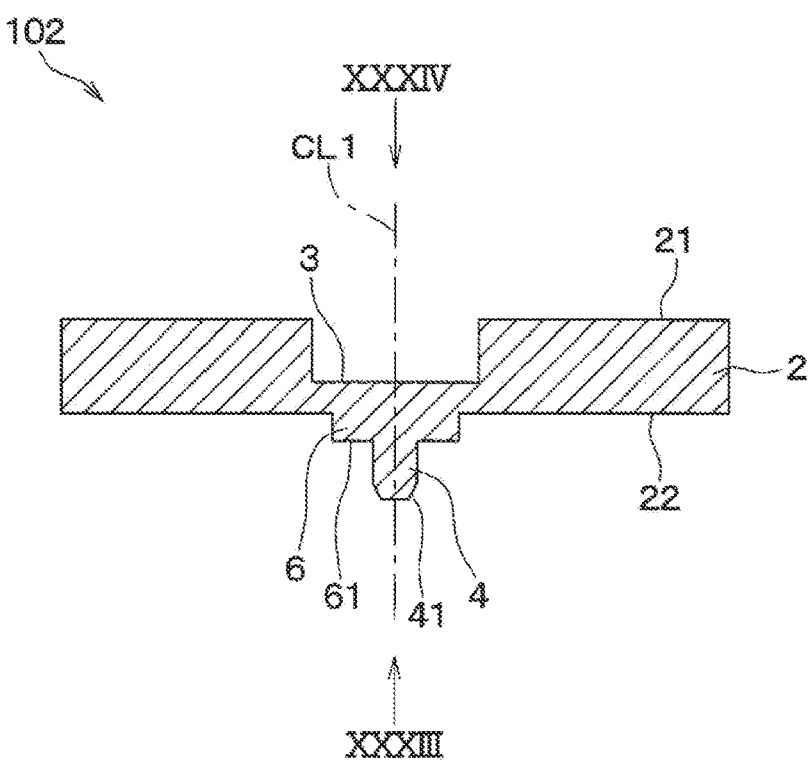
FIG. 32 is a cross-sectional view of a pressed article according to a second comparative example.
Figure 33:
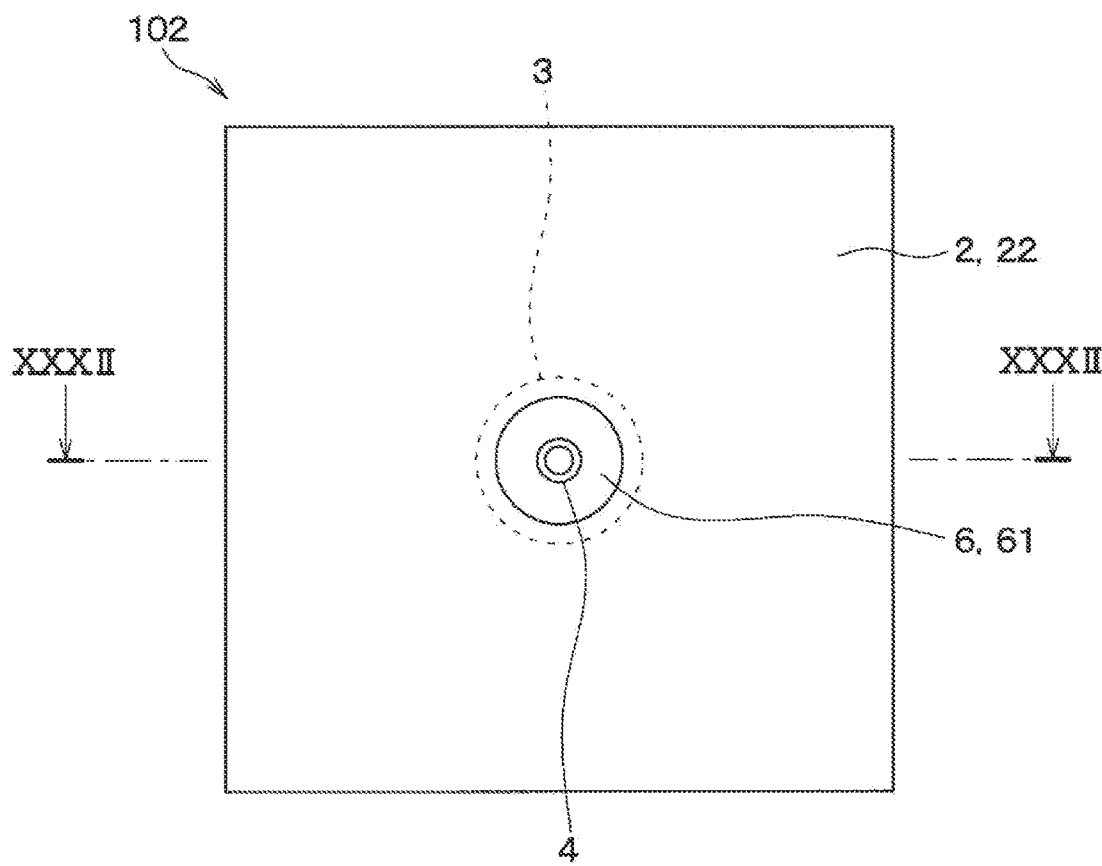
FIG. 33 is a view taken in a direction of an arrow XXXIII in FIG. 32.
Figure 34:
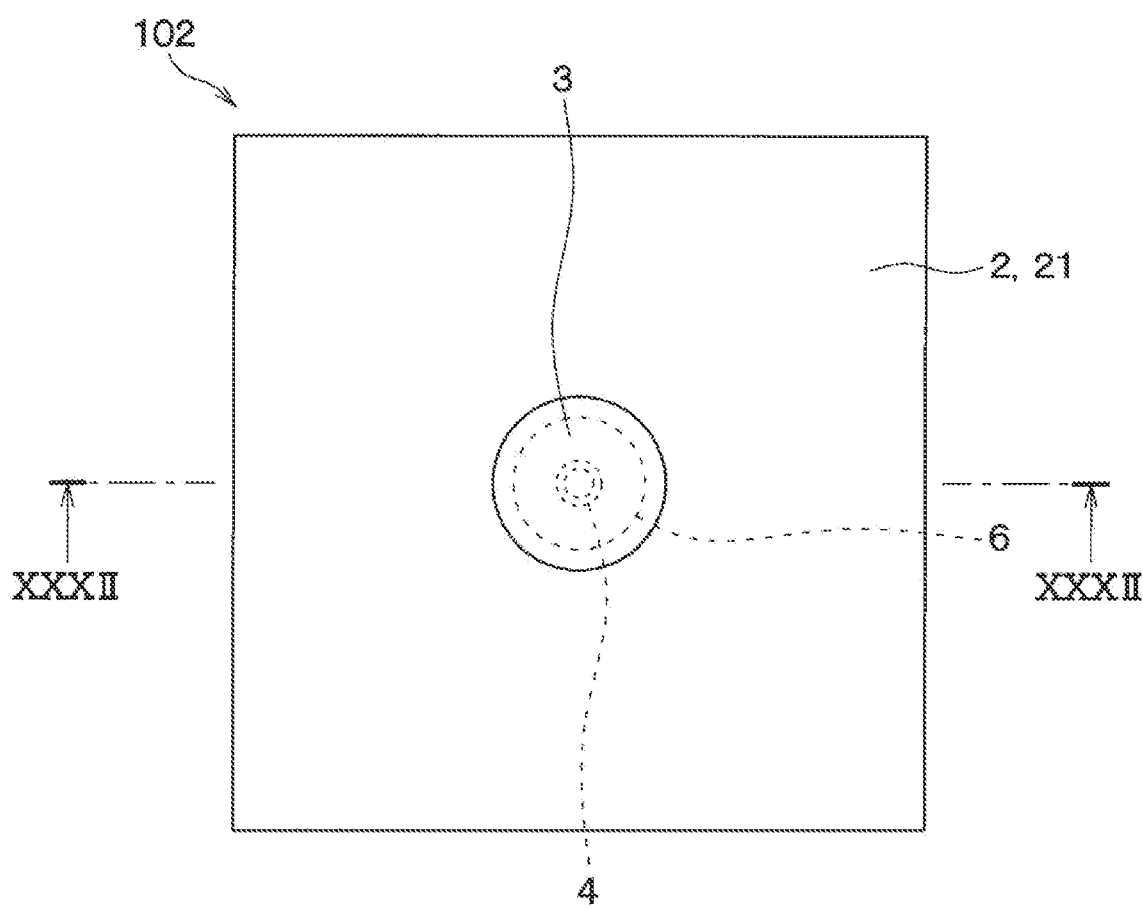
FIG. 34 is a view taken in a direction of an arrow XXXIV in FIG. 32.

As illustrated in FIGS. 32 to 34, the pressed article 102 according to the second comparative example includes the main body 2, the recess portion 3, the pin 4, and the pedestal portion 6. However, the pressed article 102 according to the second comparative example does not include the groove portion 5.

Figure 38:
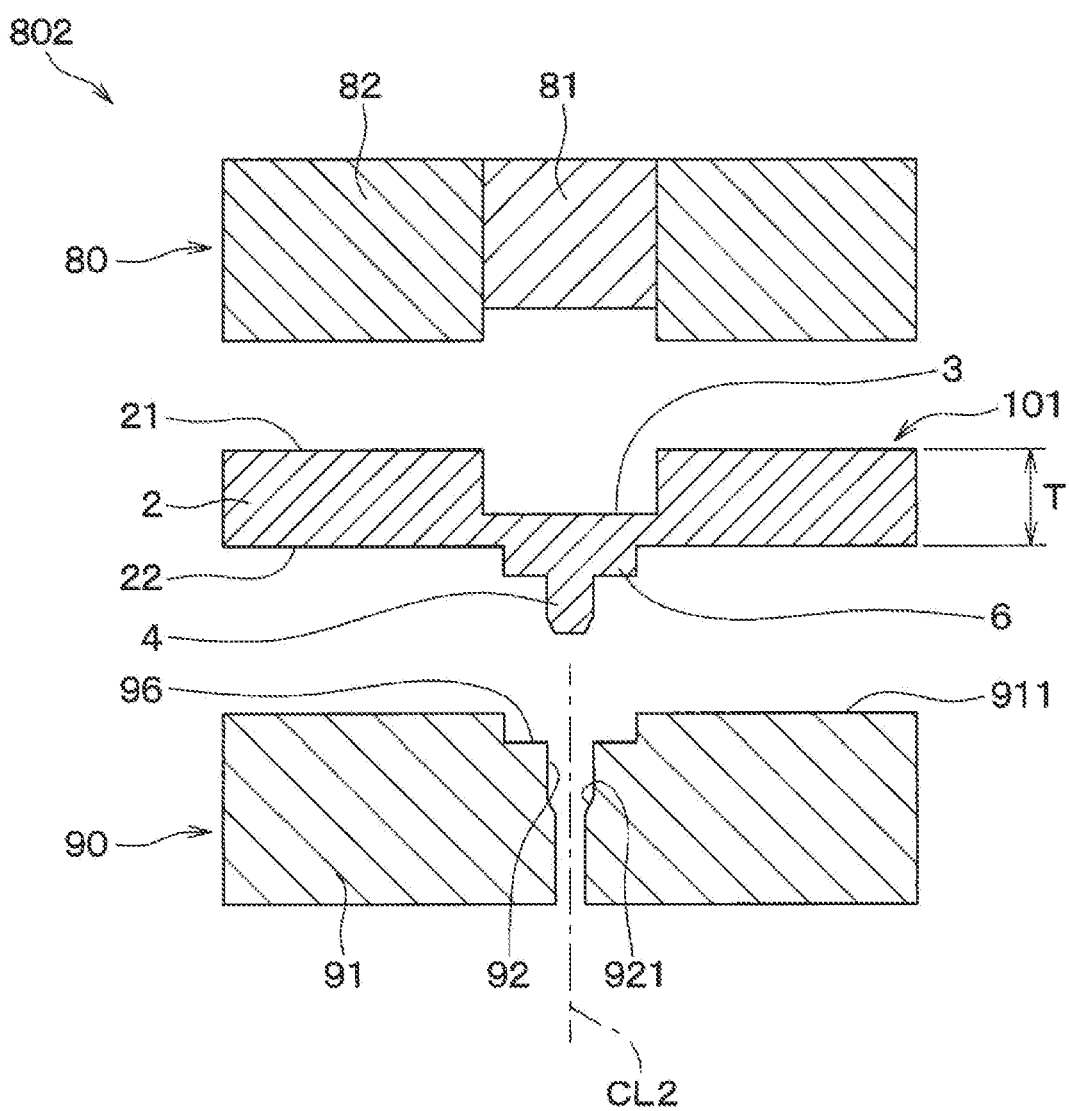
FIG. 38 is a diagram illustrating a manufacturing process of the pressed article according to the second comparative example.

FIG. 38 illustrates the pressing device 802 for manufacturing the pressed article 102 according to the second comparative example.

As illustrated in FIG. 38, the pressing device 802 according to the second comparative example also includes the first mold 80 including the punch 81 and the stripper 82, and the second mold 90 including the base portion 91, the hole portion 92, and the pedestal forming portion 96. However, the second mold 90 of the pressing device 802 according to the second comparative example does not include the protrusion 93.

A press working process performed by the pressing device 802 according to the second comparative example will be described with reference to FIGS. 35 to 38.

Figure 35:
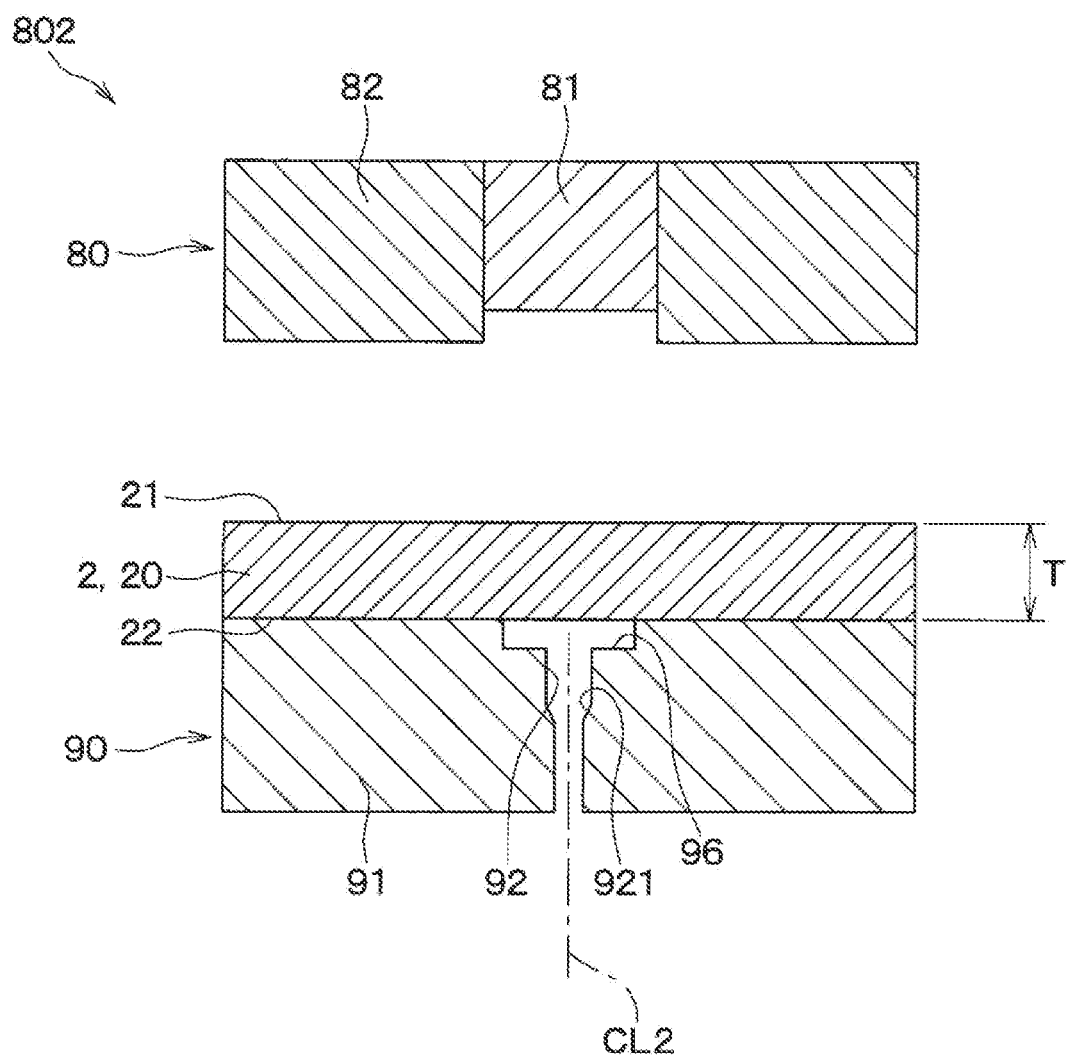
FIG. 35 is a diagram illustrating a manufacturing process of the pressed article according to the second comparative example.

First, as illustrated in FIG. 35, the pressing device 802 including the first mold 80 and the second mold 90 is prepared, and the workpiece 20 is placed between the first mold 80 and the second mold 90.

Figure 36:
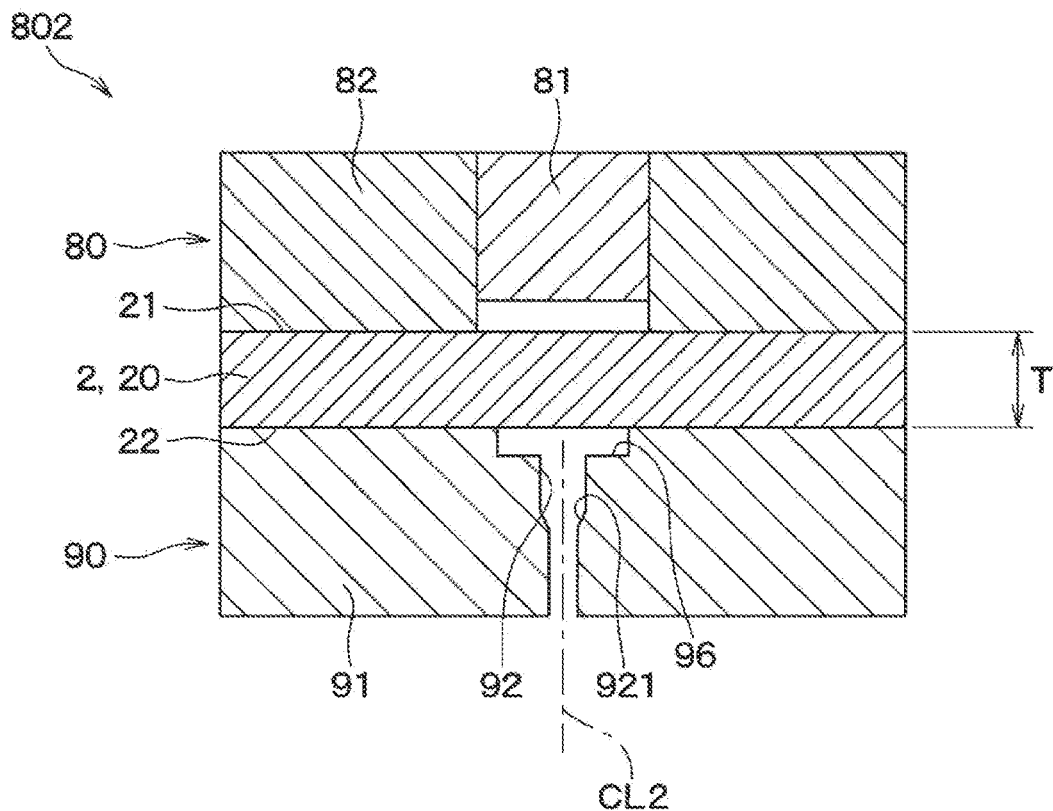
FIG. 36 is a diagram illustrating a manufacturing process of the pressed article according to the second comparative example.

Next, as illustrated in FIG. 36, the first mold 80 is moved toward the second mold 90.

Figure 37:
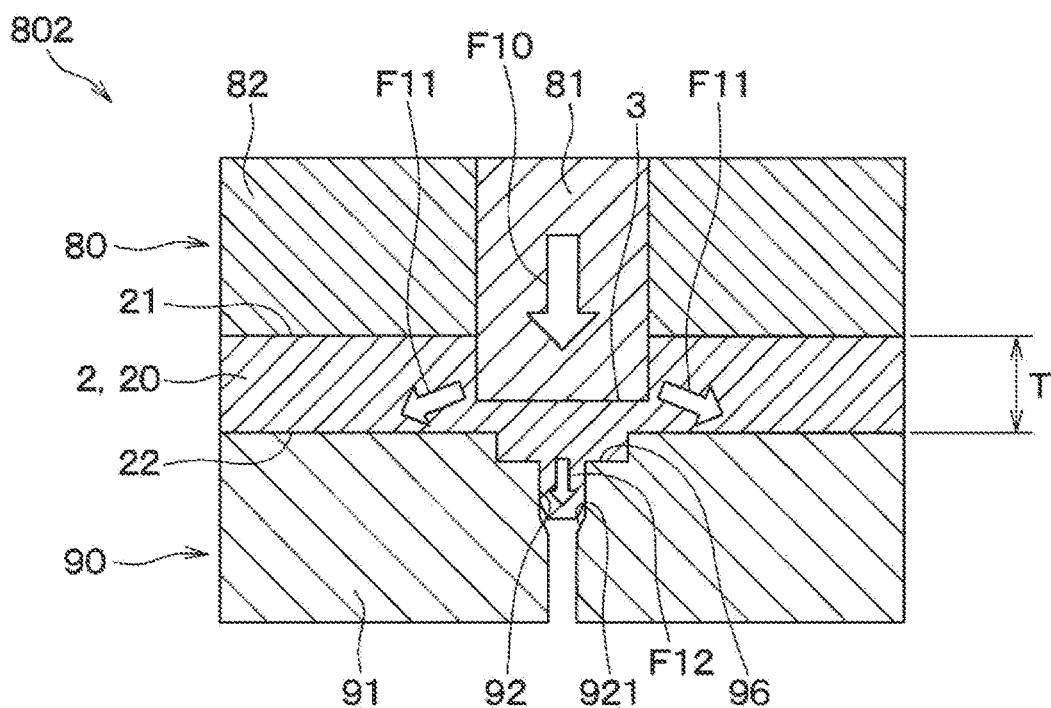
FIG. 37 is a diagram illustrating a manufacturing process of the pressed article according to the second comparative example.

Subsequently, as indicated by an arrow F10 in FIG. 37, the punch 81 is driven into the workpiece 20, the recess portion 3 is formed in the first surface 21, and the pedestal portion 6 and the pin 4 are formed on an opposite side. At this time, in the pressing device 8 according to the second comparative example, as indicated by arrows F11, most of the material of the main body 2 that is the workpiece 20 flows in the surface direction of the second surface 22 due to the pressing force of the punch 81. Therefore, as indicated by an arrow F12, the propulsive force for extruding the material of the workpiece 20 into the hole portion 92 of the second mold 90 is reduced. In the second comparative example, since the hole portion 92 also has the constant inner diameter from the inlet side to the large diameter side of the tapered portion 921, the frictional resistance between the material of the workpiece 20 extruded inside the hole portion 92 and the inner wall of the hole portion 92 is large. Therefore, in the second comparative example, the material of the workpiece 20 does not sufficiently enter the hole portion 92 of the second mold 90, and the pin 4 is formed to be low.

Thereafter, as illustrated in FIG. 38, the pressed article 102 according to the second comparative example is removed from between the first mold 80 and the second mold 90.

When the pressed article 102 according to the second comparative example and another component are caulked and connected to each other, since the pressed article 102 according to the second comparative example includes the pin 4 formed to be lower than that in the second embodiment, the strength of the caulking connection may be weakened.

Operation and Effect of Second Embodiment

The pressed article 1, the pressing device 8, and the pressing method according to the second embodiment described above have a similar configuration as that of the first embodiment, and thus have similar operations and effects as those of the first embodiment. Further, the pressed article 1 and the pressing device 8 according to the second embodiment have the following operations and effects.

(1) The pressed article 1 according to the second embodiment includes the pedestal portion 6 that is provided in the periphery of the pin 4 on the second surface 22 of the main body 2. The pedestal portion 6 has the surface 61 perpendicular to the axis center CL1 of the pin 4. The shape and the size of the recess portion 3 are the same as or larger than the shape and the size of the pedestal portion 6 when viewed in the plate thickness direction of the main body 2. The groove portion 5 is provided to surround at least a part of the periphery of the pin 4 and the pedestal portion 6.

Accordingly, when the pressed article 1 includes the pedestal portion 6 in the periphery the pin 4, the shape and the size of the recess portion 3 formed by the punch 81 are set to be the same as or larger than the shape and the size of the pedestal portion 6. Therefore, when the pressed article 1 is manufactured, a rate of decrease in a volume of the material extruded into the hole portion 92 for forming the pin 4 with respect to a volume of the material extruded by the punch 81 is increased. However, in this case, the flow of the material of the main body 2 in the surface direction of the second surface 22 due to the pressing force of the punch 81 is also blocked by the protrusion 93 of the second mold 90, so that the propulsive force for extruding the material of the main body 2 into the hole portion 92 of the second mold 90 is increased. Therefore, the pressing device 8 can ensure the straightness of the pin 4 formed in the pressed article 1 and can form the pin 4 to be high.

(2) The second mold 90 of the pressing device 8 according to the second embodiment includes, in a periphery of the hole portion 92, the pedestal forming portion 96 that forms the pedestal portion 6, which has the surface 61 perpendicular to the axis center CL1 of the pin 4, on the second surface 22 of the main body 2. The shape and the size of the punch 81 are the same as or larger than the shape and the size of the pedestal forming portion 96 when viewed in the plate thickness direction of the main body 2. The protrusion 93 is provided to surround at least a part of the periphery of the hole portion 92 and the pedestal forming portion 96.

Accordingly, when the second mold 90 includes the pedestal forming portion 96 in the periphery of the hole portion 92, the outer shape of the punch 81 is larger than that of the hole portion 92 when viewed in the plate thickness direction of the main body 2. Therefore, when the pressed article 1 is manufactured, a rate of decrease in a volume of the material extruded into the hole portion 92 for forming the pin 4 with respect to a volume of the material extruded by the punch 81 is increased. However, in this case, the flow of the material of the main body 2 in the surface direction of the second surface 22 due to the pressing force of the punch 81 is also blocked by the protrusion 93 of the second mold 90, so that the propulsive force for extruding the material of the main body 2 into the hole portion 92 of the second mold 90 is increased. Therefore, the pressing device 8 can ensure the straightness of the pin 4 formed in the pressed article 1 and can form the pin 4 to be high.

Third Embodiment

The pressed article 1 according to a third embodiment will be described. The third embodiment is a modification of the second embodiment.

Figure 22:
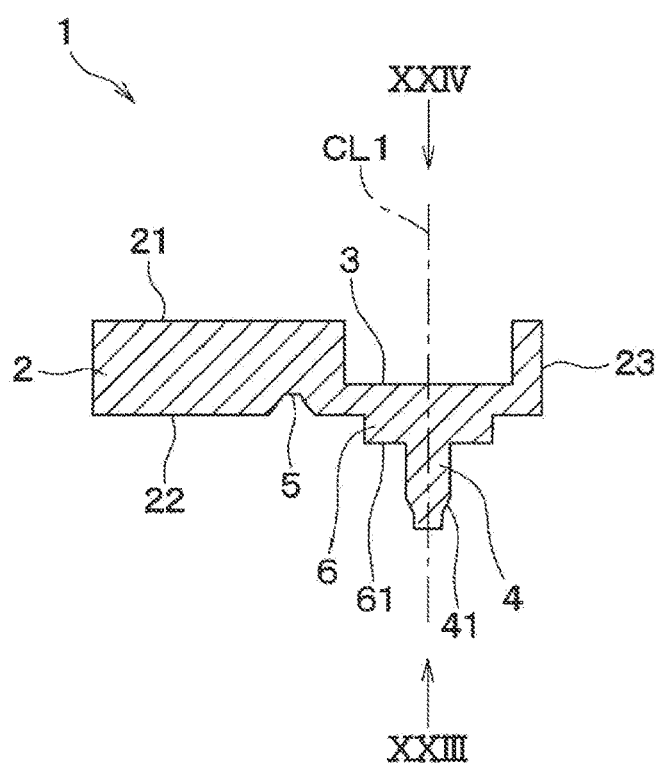
FIG. 22 is a cross-sectional view of a pressed article according to a third embodiment.
Figure 23:
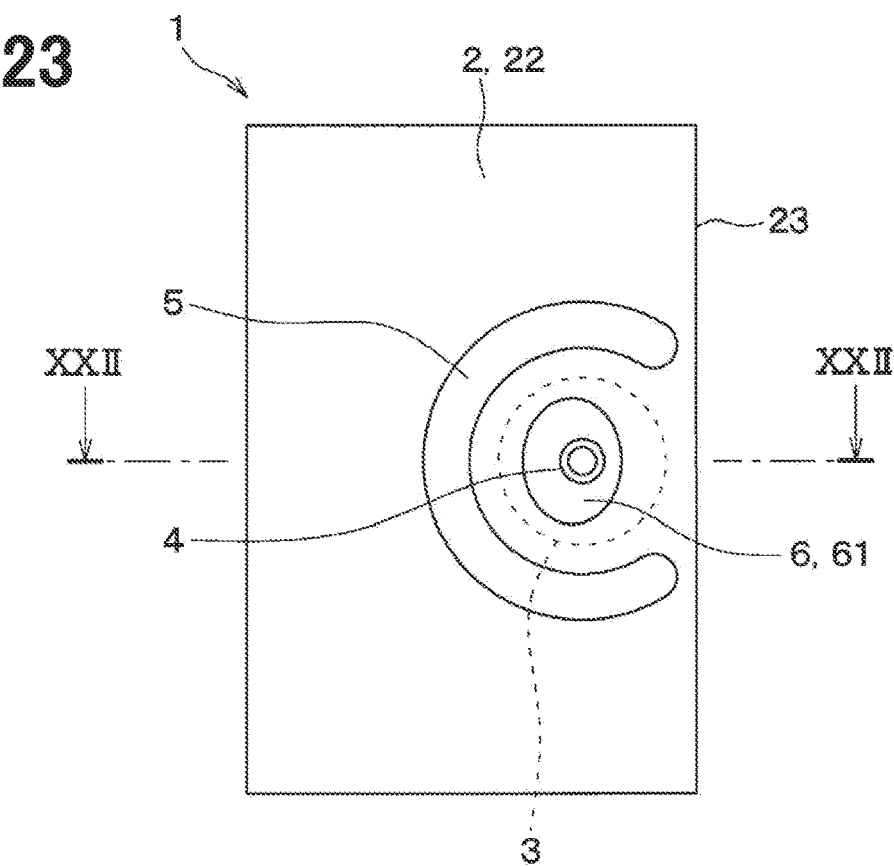
FIG. 23 is a view taken in a direction of an arrow XXIII in FIG. 22.
Figure 24:
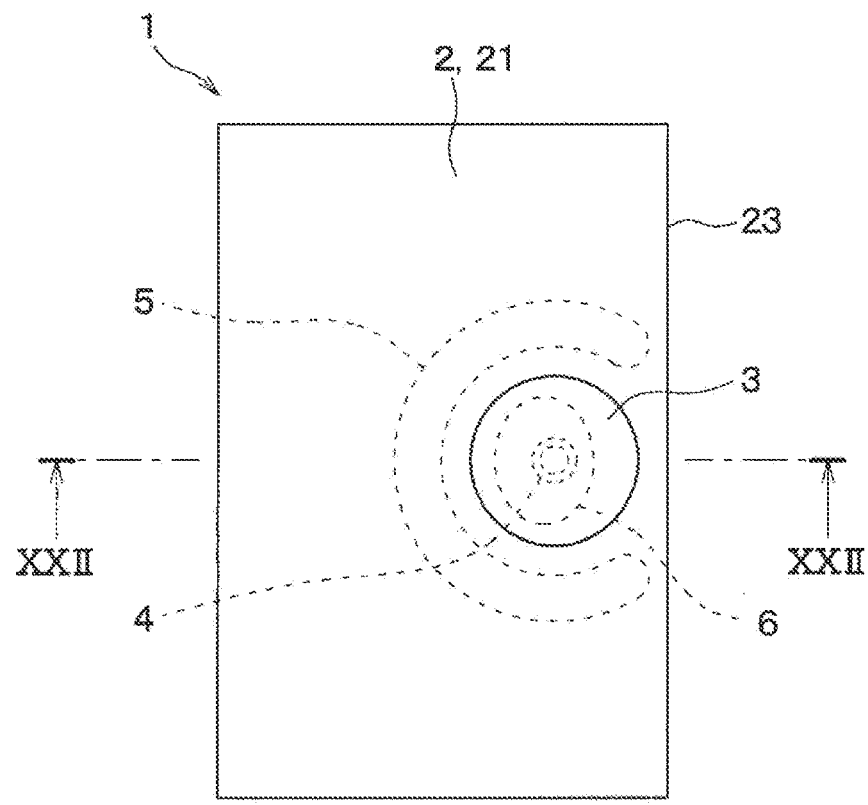
FIG. 24 is a view taken in a direction of an arrow XXIV in FIG. 22.

As illustrated in FIGS. 22 to 24, in the pressed article 1 according to the third embodiment, the pin 4 is provided in the vicinity of an outer edge 23 of the main body 2. FIGS. 22 to 24 illustrates an example in which the pin 4 is provided at a position close to the outer edge 23 on a right side of the main body 2. In this case, the groove portion 5 is provided to surround the periphery of the pin 4 with a slight distance from the outer edge 23 of the main body 2. Specifically, the groove portion 5 is formed into a C shape when viewed in the plate thickness direction of the main body 2, and is provided to surround the periphery of the pin 4 except a side close to the outer edge of the pin 4.

In the third embodiment, the position where the groove portion 5 is provided is also set in the area outside the inscribed circle of the shape of the recess portion 3 and on an inner side of the position obtained by adding the distance of 1.5 times the plate thickness T of the main body 2 to the radius of the circumscribed circle of the shape of the recess portion 3, when viewed in the plate thickness direction of the main body 2. The depth H1 of the groove portion 5 is in the range of 2% to 20%, more preferably the range of 8% to 15% of the plate thickness T of the main body 2.

In the third embodiment, the pedestal portion 6 is formed in an elliptical shape when viewed in the plate thickness direction of the main body 2.

The pressed article 1 according to the third embodiment described above has a similar configuration as those of the first and second embodiments, and thus has similar operations and effects as those of the first and second embodiments.

Although not shown, as a modification of the first embodiment, when the pin 4 is located in the vicinity of the outer edge 23 of the main body 2, as described in the third embodiment, the groove portion 5 can be provided to surround the periphery of the pin 4 with a slight distance from the outer edge 23 of the main body 2.

Other Embodiments (1) In the first to third embodiments, in the pressed article 1, an outer shape of the main body 2 when viewed in the plate thickness direction of the main body 2 is a rectangular shape, but is not limited thereto, and the outer shape of the main body 2 may be various shapes such as a circular shape, an elliptical shape, and a polygonal shape.

(2) In the first and second embodiments, in the pressed article 1, the outer shapes of the recess portion 3, the pin 4, and the pedestal portion 6 when viewed in the plate thickness direction of the main body 2 are circular shapes, but are not limited thereto, and the outer shapes of the recess portion 3, the pin 4, and the pedestal portion 6 may be various shapes, for example, an elliptical shape or a polygonal shape.

(3) In the first and second embodiments described above, in the pressed article 1, the outer shape of the groove portion 5 when viewed in the plate thickness direction of the main body 2 is a circular shape, but is not limited thereto, and the outer shape of the groove portion 5 may be various shapes, for example, an elliptical shape, a C shape, or a polygonal shape.

(4) In the first to third embodiments, in the pressed article 1, the shape of the groove portion 5 in the cross-sectional view parallel to the plate thickness direction of the main body 2 is a trapezoidal shape, but is not limited thereto, and the shape of the groove portion 5 may be various shapes, for example, a V shape, a U shape, and a rectangular shape.

(5) The shape of the punch 81 of the first mold 80, the shape of the hole portion 92 of the second mold 90, the shape of the pedestal forming portion 96, and the shape of the protrusion 93 may be various shapes according to the shapes of the recess portion 3, the pin 4, the pedestal portion 6, and the groove portion 5 of the pressed article 1.

(6) The pin 4 of the pressed article 1 is not limited to use for caulking and connecting the pressed article 1 with another member, and may be used for other purposes.

(7) In addition to the press working for forming the recess portion 3, the pin 4, the pedestal portion 6, and the groove portion 5 in the main body 2, the pressed article 1 may be obtained by performing a process other than the press working.

The present disclosure is not limited to the above-described embodiments, and can be modified as appropriate. The above-described embodiments are not independent of each other, and can be appropriately combined together except when the combination is obviously impossible. In each of the above-described embodiments, constituent elements of the embodiments are not necessarily indispensable as a matter of course, except when the elements are particularly specified as indispensable and the elements are considered as obviously indispensable in principle. Further, in each of the above-described embodiments, when numerical values such as the number, numerical value, quantity, range, and the like of the constituent elements of the embodiments are referred to, except in a case where the numerical values are expressly indispensable in particular, a case where the numerical values are obviously limited to a specific number in principle, and the like, the present disclosure is not limited to the specific number. Further, in each of the above-mentioned embodiments, when referring to the shape, positional relationship, and the like of a constituent element and the like, the constituent element is not limited to the shape, positional relationship, and the like, except for a case where the constituent element is specifically specified, a case where the constituent element is limited in principle to a specific shape, positional relationship, and the like.

What is claimed is:

1. A pressed article comprising:
   a plate-shaped main body;
   a recess portion provided in a first surface of the main body facing one side in a plate thickness direction of the main body;
   a pin provided at a position corresponding to the recess portion on a side of a second surface opposite to the first surface of the main body, having an outer shape smaller than an outer shape of the recess portion when viewed in the plate thickness direction of the main body, and protruding in the plate thickness direction of the main body; and
   a groove portion recessed from the second surface of the main body toward the first surface, in a C shape when viewed in the plate thickness direction of the main body, and surrounding a part of a periphery of the pin.

2. The pressed article according to claim 1, wherein
   a position where the groove portion is provided is in an area outside an inscribed circle of a shape of the recess portion and on an inner side of a position, which is obtained by adding a distance of 1.5 times a plate thickness of the main body to a radius of a circumscribed circle of the shape of the recess portion, when viewed in the plate thickness direction of the main body.

3. The pressed article according to claim 1, wherein
   a depth of the groove portion is in a range of 2% to 20% of a plate thickness of the main body.

4. The pressed article according to claim 1, wherein
   the groove portion has such a tapered inner wall surface that a width of the groove portion gradually decreases from the second surface toward the first surface in a cross-sectional view, which is parallel to the plate thickness direction of the main body.

5. The pressed article according to claim 1, further comprising:
- a pedestal portion provided in a periphery of the pin on the second surface of the main body and having a surface perpendicular to an axis center of the pin, wherein
- a shape and a size of the recess portion are same as or larger than a shape and a size of the pedestal portion when viewed in the plate thickness direction of the main body, and
- the groove portion surrounds at least a part of a periphery of the pin and the pedestal portion.

6. The pressed article according to claim 1, wherein in a cross-sectional view parallel to the plate thickness direction of the main body, a distance between the recess portion and the groove portion is larger than a distance between the recess portion and the second surface.

7. The pressed article according to claim 1, wherein the pin is closer to one outer edge of the main body than an other outer edge of the main body, when viewed in the plate thickness direction.

8. The pressed article according to claim 7, wherein the groove portion surrounds the part of the periphery of the pin, without surrounding an other part of the periphery of the pin on a side of the one outer edge of the main body.

9. The pressed article according to claim 1, further comprising:
- a pedestal portion provided in a periphery of the pin on the second surface of the main body and having a surface perpendicular to an axis center of the pin, wherein
- the pedestal portion is formed in an elliptical shape when viewed in the plate thickness direction of the main body.

10. The pressed article according to claim 1, wherein the pin is provided in the vicinity of an outer edge of the main body, when viewed in the plate thickness direction.

* * * * *